(12) United States Patent
Tegg et al.

(10) Patent No.: US 12,446,954 B2
(45) Date of Patent: Oct. 21, 2025

(54) METHODS AND DEVICES FOR ESTIMATING TIP-TISSUE COUPLING OF AN ABLATION CATHETER TIP

(71) Applicant: St. Jude Medical, Cardiology Division, Inc., St. Paul, MN (US)

(72) Inventors: Troy T. Tegg, Elk River, MN (US); Brett A. Hillukka, Hanover, MN (US); Timothy G. Curran, Ramsey, MN (US); Jeffrey M. Fish, Maplewood, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 730 days.

(21) Appl. No.: 15/724,157

(22) Filed: Oct. 3, 2017

(65) Prior Publication Data

US 2018/0092689 A1    Apr. 5, 2018

Related U.S. Application Data

(60) Provisional application No. 62/404,060, filed on Oct. 4, 2016, provisional application No. 62/404,038, filed
(Continued)

(51) Int. Cl.
*A61B 18/14* (2006.01)
*A61B 17/00* (2006.01)
(Continued)

(52) U.S. Cl.
CPC .............. *A61B 18/1492* (2013.01); *A61B 2017/00092* (2013.01); *A61B 2017/00154* (2013.01);
(Continued)

(58) Field of Classification Search
CPC .......... A61B 18/1492; A61B 2090/065; A61B 2018/00791; A61B 2017/00154;
(Continued)

(56) References Cited

U.S. PATENT DOCUMENTS 6,063,078 A * 5/2000 Wittkampf ......... A61B 18/1492
606/41
6,245,061 B1   6/2001 Panescu et al.
(Continued)

FOREIGN PATENT DOCUMENTS

EP    2949282 A1    12/2015
EP    3020355 A1    5/2016
(Continued)

*Primary Examiner* — Sean W Collins
(74) *Attorney, Agent, or Firm* — Armstrong Teasdale LLP

(57) ABSTRACT

Aspects of the present disclosure are directed to, for example, a method for determining a temperature distribution across an ablation catheter tip. The method including contacting tissue with a distal tip of an ablation catheter, receiving temperature data from a plurality of thermocouples distributed about the distal tip of the ablation catheter, and based on the received temperature data, determine a temperature distribution across the distal tip of the ablation catheter. Also disclosed is a method of controlling the temperature of an ablation catheter tip while creating a desired lesion using various energy sources and energy delivery methodologies.

19 Claims, 30 Drawing Sheets
(3 of 30 Drawing Sheet(s) Filed in Color)

Related U.S. Application Data on Oct. 4, 2016, provisional application No. 62/404,013, filed on Oct. 4, 2016.

(51) Int. Cl.
    *A61B 18/00*     (2006.01)
    *A61B 90/00*     (2016.01)

(52) U.S. Cl.
    CPC ............ *A61B 2017/00176* (2013.01); *A61B 2018/00351* (2013.01); *A61B 2018/00577* (2013.01); *A61B 2018/00642* (2013.01); *A61B 2018/00708* (2013.01); *A61B 2018/00791* (2013.01); *A61B 2018/00797* (2013.01); *A61B 2018/00821* (2013.01); *A61B 2018/00875* (2013.01); *A61B 2018/00904* (2013.01); *A61B 2090/065* (2016.02); *A61B 2218/002* (2013.01)

(58) Field of Classification Search
    CPC ........... A61B 2017/00092; A61B 2018/00821; A61B 2018/00642; A61B 2018/00708; A61B 2218/002; A61B 2017/00176; A61B 2018/00904; A61B 2018/00351; A61B 2018/00577; A61B 2018/00875; A61B 2018/00797

See application file for complete search history.

(56) References Cited

U.S. PATENT DOCUMENTS

| | | | |
|---|---|---|---|
| 2002/0022834 A1 | 2/2002 | Simpson et al. | |
| 2002/0128643 A1* | 9/2002 | Simpson | A61B 18/1492 606/41 |
| 2004/0006337 A1 | 1/2004 | Nasab et al. | |
| 2005/0096644 A1* | 5/2005 | Hall | A61B 18/14 606/41 |
| 2008/0161797 A1* | 7/2008 | Wang | A61B 18/1492 606/41 |
| 2009/0240249 A1 | 9/2009 | Chan et al. | |
| 2010/0331658 A1 | 12/2010 | Kim et al. | |
| 2011/0152857 A1* | 6/2011 | Ingle | A61B 18/1206 606/40 |
| 2011/0224667 A1 | 9/2011 | Koblish et al. | |
| 2011/0264087 A1* | 10/2011 | Haemmerich | A61B 18/1492 606/33 |
| 2012/0116383 A1* | 5/2012 | Mauch | A61M 25/0138 606/33 |
| 2012/0165809 A1 | 6/2012 | Christian et al. | |
| 2013/0338664 A1 | 12/2013 | Wang et al. | |
| 2014/0012160 A1* | 1/2014 | Ghaffari | A61B 5/6885 600/587 |
| 2014/0012242 A1* | 1/2014 | Lee | A61B 18/02 606/21 |
| 2014/0163548 A1 | 6/2014 | Christian | |
| 2014/0276052 A1 | 9/2014 | Rankin et al. | |
| 2015/0088119 A1 | 3/2015 | Moss | |
| 2015/0112149 A1 | 4/2015 | Govari et al. | |
| 2015/0112321 A1* | 4/2015 | Cadouri | A61B 18/1206 606/34 |
| 2015/0126995 A1 | 5/2015 | Govari et al. | |
| 2015/0327921 A1 | 11/2015 | Govari et al. | |
| 2016/0022352 A1* | 1/2016 | Johnson | A61B 18/148 606/41 |
| 2016/0128765 A1 | 5/2016 | Schultz et al. | |
| 2016/0278841 A1 | 9/2016 | Panescu et al. | |
| 2016/0278856 A1* | 9/2016 | Panescu | A61B 5/6852 |

FOREIGN PATENT DOCUMENTS

| | | |
|---|---|---|
| WO | 2007023407 A1 | 3/2007 |
| WO | 2015065966 A2 | 5/2015 |
| WO | 2016081650 A1 | 5/2016 |
| WO | 2016161209 A1 | 10/2016 |

\* cited by examiner

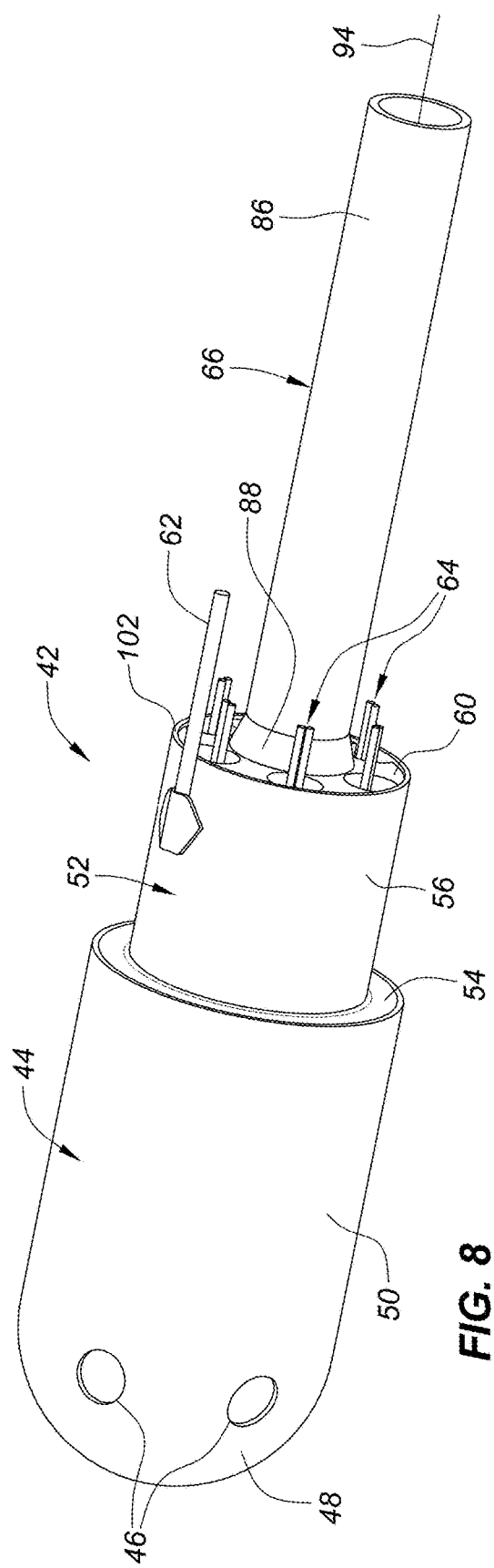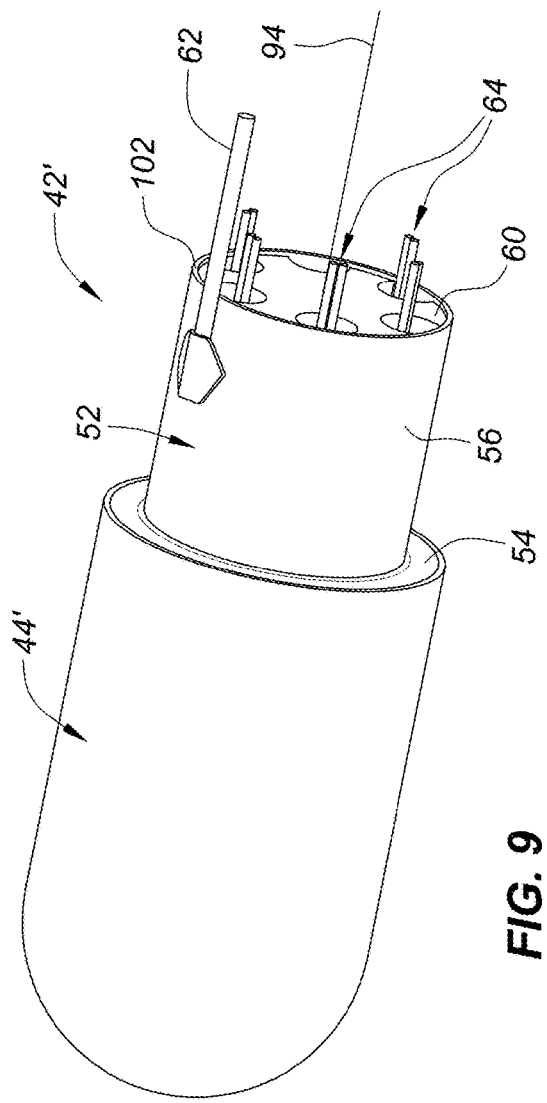
FIG. 8
FIG. 9

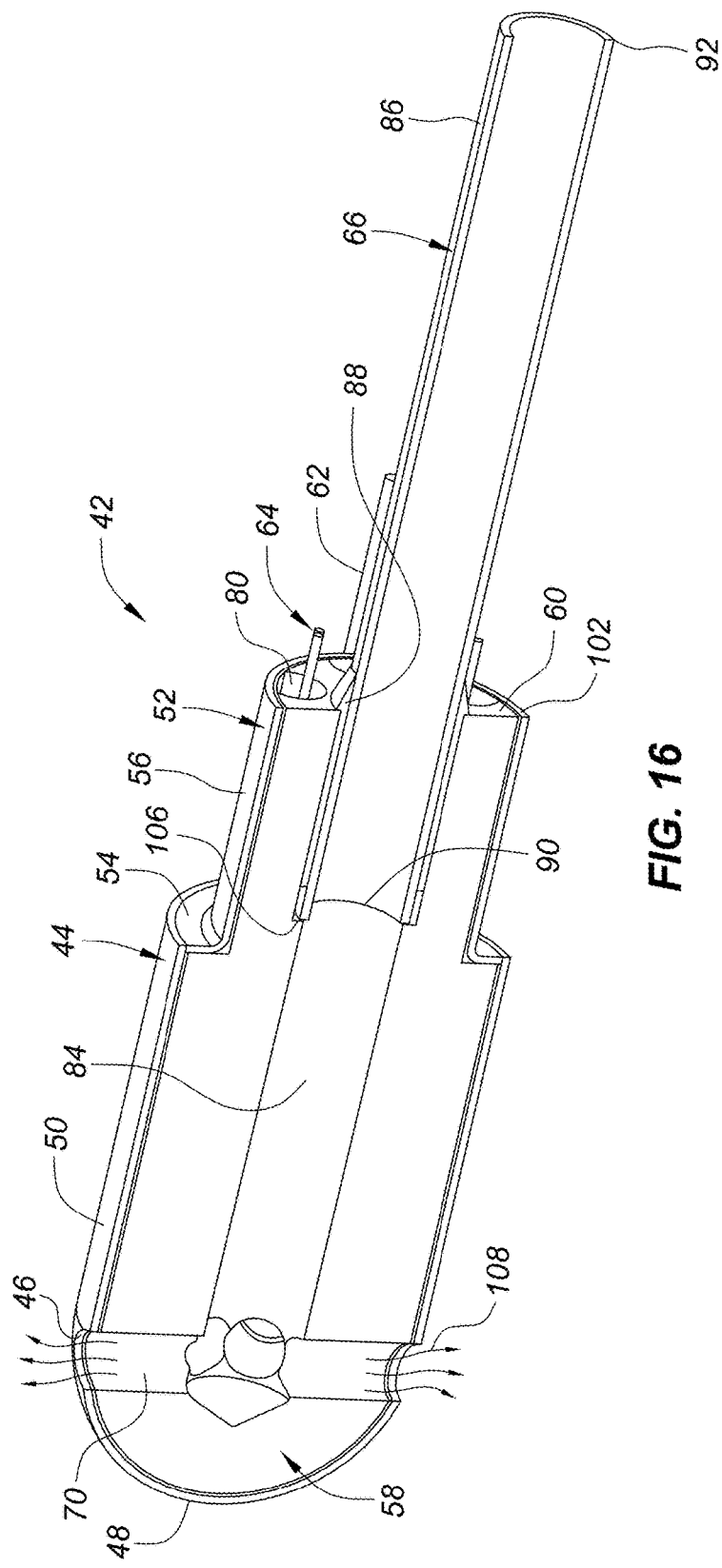
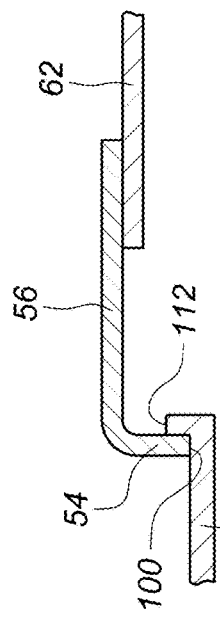
FIG. 16
FIG. 17

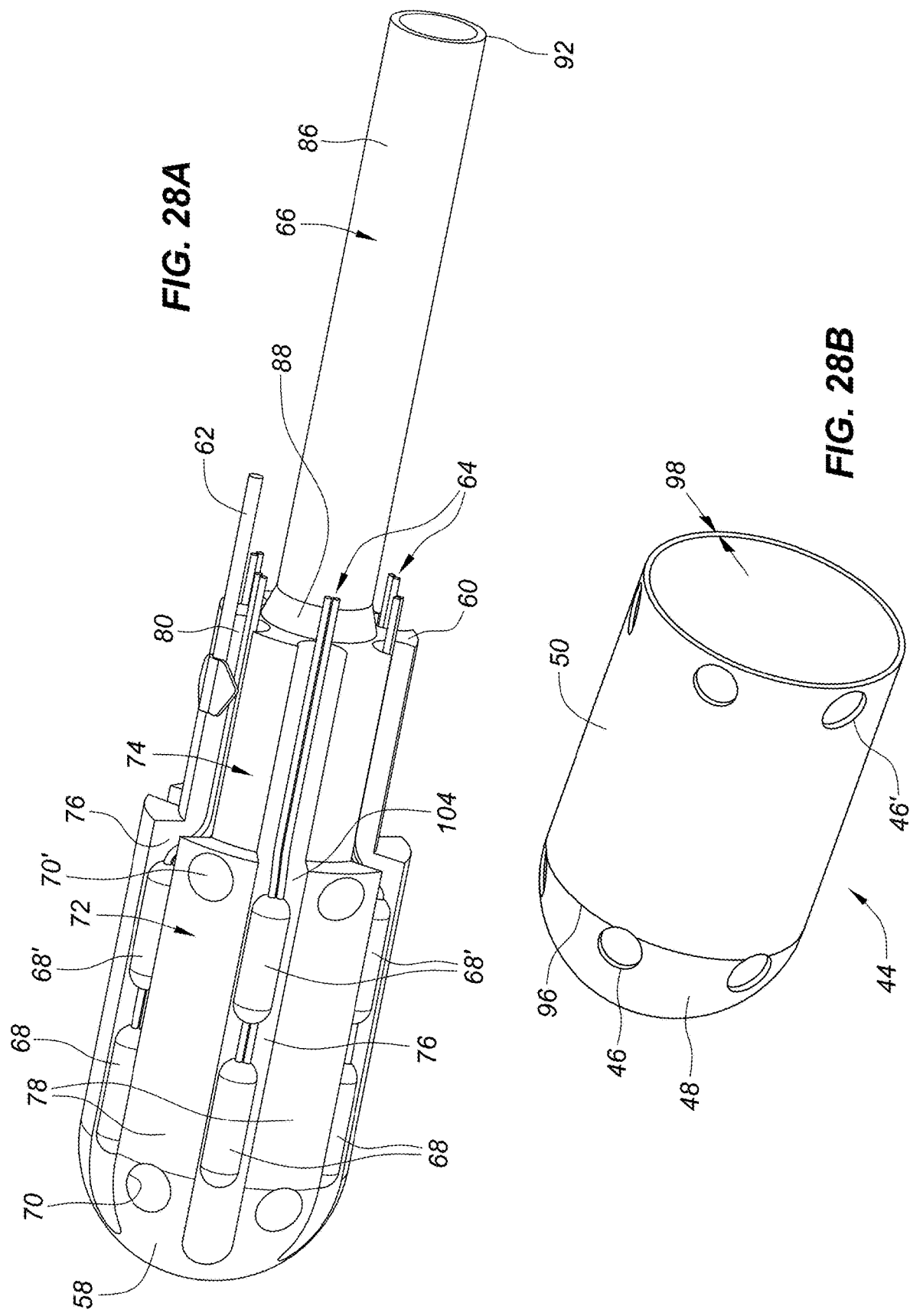

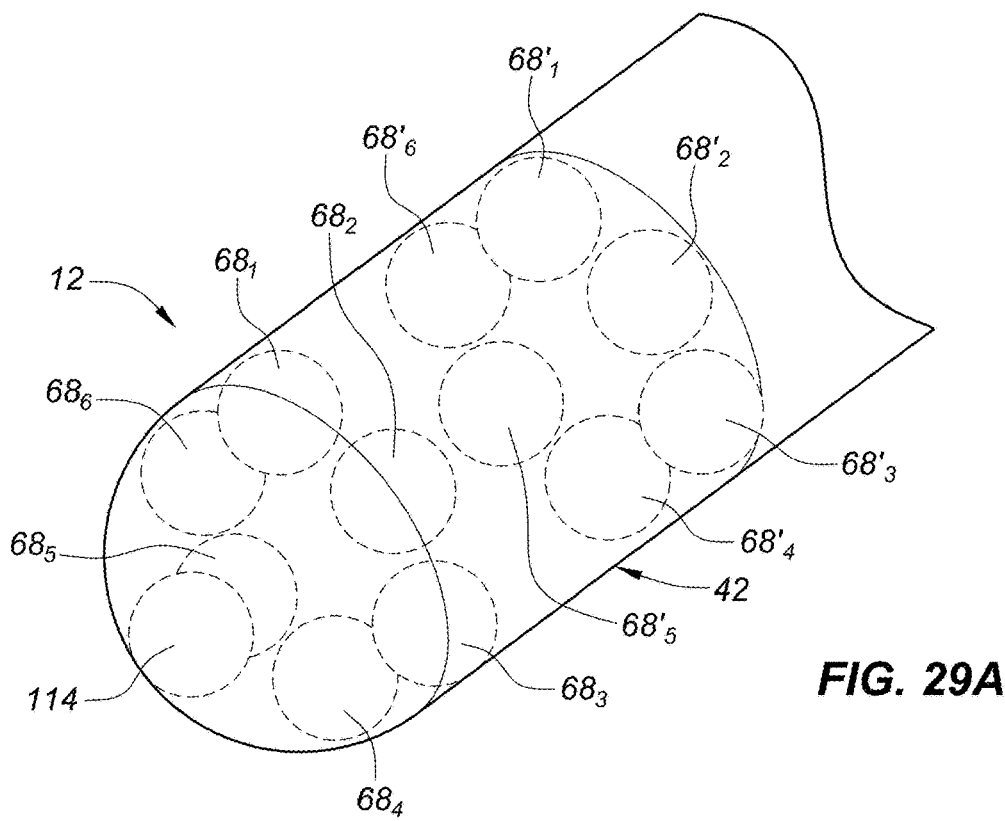
FIG. 29A
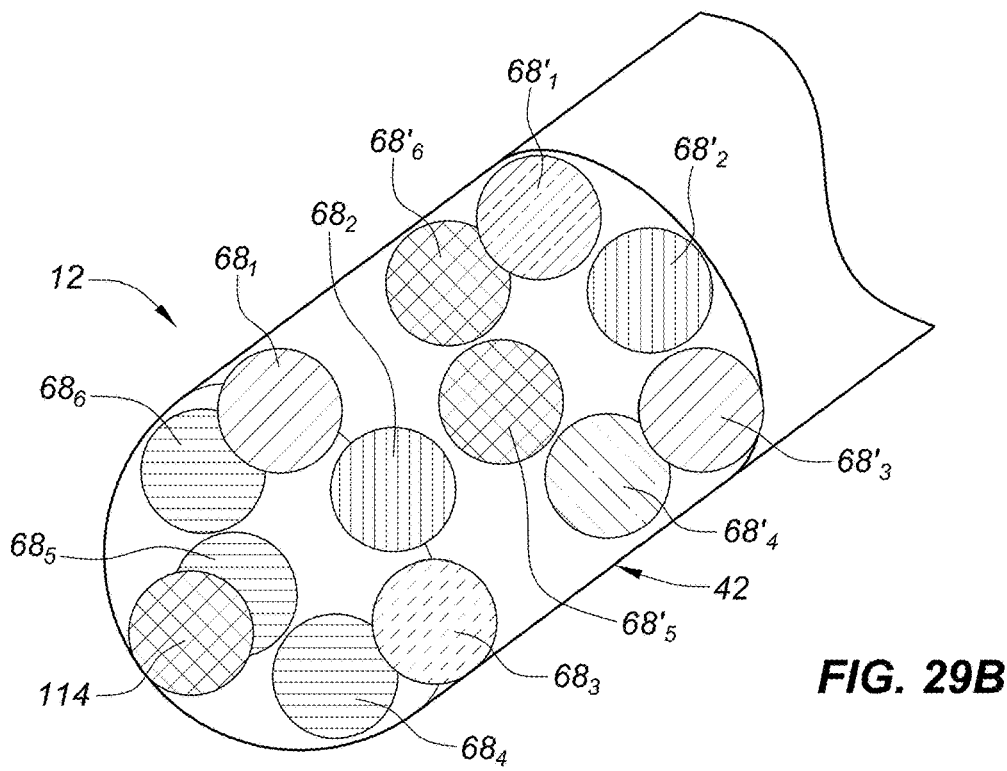
FIG. 29B
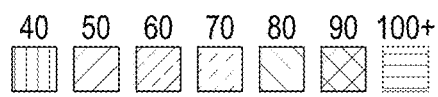

METHODS AND DEVICES FOR ESTIMATING TIP-TISSUE COUPLING OF AN ABLATION CATHETER TIP

CROSS-REFERENCE TO RELATED APPLICATIONS

This application claims the benefit of U.S. provisional application Nos. 62/404,060, 62/404,038, and 62/404,013, all of which were filed 4 Oct. 2016, which are hereby incorporated by reference as though fully set forth herein This application is related to U.S. application Ser. No. 15/088,036, filed 31 Mar. 2016, now pending, which claims the benefit of U.S. provisional application No. 62/141,066, filed 31 Mar. 2015, and U.S. application Ser. No. 15/088, 052, filed 31 Mar. 2016, now pending, which claims the benefit of U.S. provisional application No. 62/198,114, filed 28 Jul. 2015, all of which are hereby incorporated by reference as though fully set forth herein.

BACKGROUND OF THE DISCLOSURE

The present disclosure relates to low thermal mass ablation catheter tips (also known as high-thermal-sensitivity ("HTS") catheter tips) and to systems for controlling the delivery of RF energy to such catheters during ablation procedures.

The foregoing discussion is intended only to illustrate the present field and should not be taken as a disavowal of claim scope.

BRIEF SUMMARY OF THE DISCLOSURE

Various embodiments of the present disclosure are directed to determining a tissue-coupling area between an ablation catheter tip and tissue. It is desirable to know the tissue-coupling area to facilitate improved control of an ablation therapy and to enable the creation of lesions in tissue by generating sufficient power to form adequate lesions while mitigating against overheating of tissue.

Aspects of the present disclosure are directed to methods of determining temperature distribution across a distal tip of an ablation catheter. The method including contacting a distal tip of an ablation catheter with tissue, and receiving temperature data from a plurality of thermocouples distributed about the distal tip of the ablation catheter. Based on the received temperature data, a temperature distribution across the distal tip of the ablation catheter may be determined and presented to a clinician. In further more specific embodiments, the method includes determining a coupling area between the distal tip and the tissue based on a number of the plurality of thermocouples above a temperature threshold or a percentage of temperature increase above a temperature baseline. In such embodiments, the number of thermocouples sensing a temperature above the temperature threshold may be correlated with an area of the distal tip that is coupled with the tissue.

Some embodiments of the present disclosure are directed to a method for estimating tip-tissue coupling between tissue and an ablation catheter tip. The method including generating power, emitted at the ablation catheter tip, of approximately 0.25-3 Watts (0.5 watts in some embodiments). Temperature data from a plurality of thermocouples distributed about the distal tip of the ablation catheter is received, and the thermocouples are associated with a tip-tissue coupling area when the temperature data received from the thermocouple exceeds a threshold indicative of a catheter tip area being coupled to tissue. Based on the number of thermocouples determined to be coupled with tissue, a total tip-tissue contact area is estimated.

Yet other embodiments of the present disclosure are directed to methods of ablating tissue with an ablation catheter tip. One method includes contacting a distal tip of an ablation catheter with tissue, and generating an ablative power and transmitting the energy to the tissue through the ablation catheter tip. In response to the energy transmitted to the tissue, a plurality of thermocouples distributed about the distal tip of the ablation catheter receives temperature data indicative of tissue warming. Based on the received temperature data, the ablative power generated for the ablation may be adjusted to create a desired lesion size at the interface between the tissue and the catheter tip. In more specific embodiments, the method may further include determining a coupling area between the distal tip and the tissue based on temperature data from the plurality of thermocouples, and determining an energy delivered by the ablation catheter tip to the coupled tissue based on the generated ablative power, the coupling area, and the length of the ablation therapy.

The foregoing and other aspects, features, details, utilities, and advantages of the present disclosure will be apparent from reading the following description and claims, and from reviewing the accompanying drawings.

DESCRIPTION OF THE DRAWINGS

The patent or application file contains at least one drawing executed in color. Copies of this patent or patent application publication with color drawings will be provided by the Office upon request and payment of the necessary fee.

Various example embodiments may be more completely understood in consideration of the following detailed description in connection with the accompanying drawings, in which:

FIG. 8 is a fragmentary, isometric view of various components comprising the distal end of an ablation catheter that could be used with the pulsed RF control systems disclosed herein.

FIG. 9 is similar to FIG. 8, but depicts components of the distal end of a non-irrigated catheter that could be used in combination with the pulsed RF control systems disclosed herein.

FIG. 16 is similar to FIG. 15, but is a cross-sectional view taken at an angular orientation that bisects two of the lateral irrigation channels.

FIG. 17 is an enlarged, fragmentary, cross-sectional view showing a possible interconnection between the shell cylindrical body, the shank, and an RF lead wire.

FIG. 28A is most similar to FIG. 20, but depicts an embodiment of the tip insert on which both distal and proximal temperature sensors are mounted.

FIG. 28B is an isometric view of a conductive shell for assembly over the tip insert of FIG. 28A, consistent with various aspects of the present disclosure.

FIG. 29A is an isometric view of a catheter tip including a plurality of thermocouple nodes distributed about the catheter tip, consistent with various aspects of the present disclosure.

FIG. 29B is an isometric view of a catheter tip including a plurality of thermocouple nodes distributed about the catheter tip, where each thermocouple node is shaded in gray scale to depict a sensed temperature indicative of a particular environment, consistent with various aspects of the present disclosure.

Figure 1:
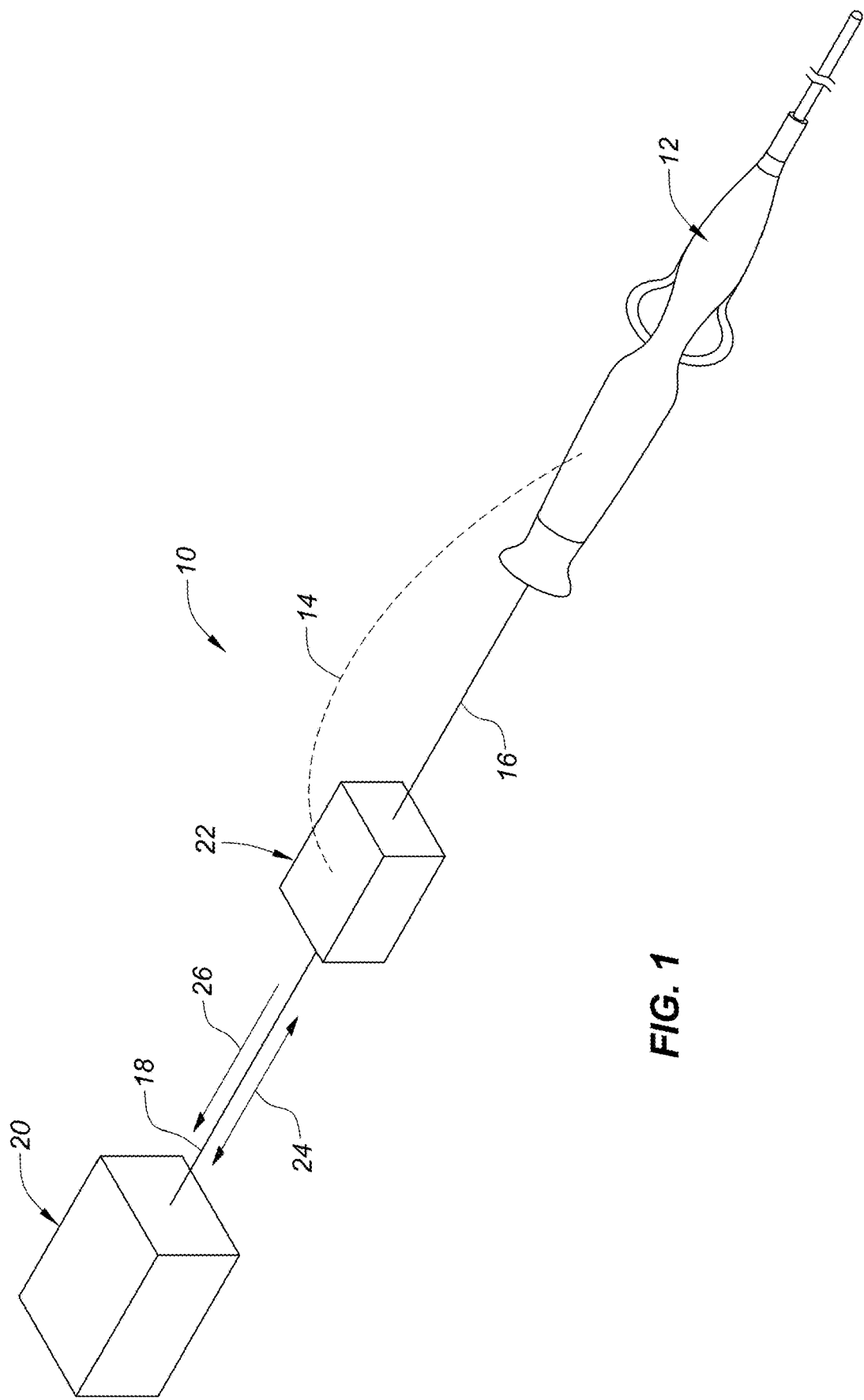
FIG. 1 is a highly-schematic representation of one embodiment of a system for delivering pulsed RF energy during catheter ablation, showing possible communication pathways between primary components in this embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION OF EMBODIMENTS

FIG. 1 is a highly-schematic representation of one embodiment of a system 10 for delivering pulsed RF energy to an ablation catheter 12 during catheter ablation, showing possible communication pathways 14, 16, 18 between primary components in this embodiment. This figure depicts a generator 20 operatively connected to a pulse control box 22, which is operatively connected to the ablation catheter 12. In this figure, a number of possible wired and/or wireless communication pathways are shown. For example, a dashed line 14 represents temperature feedback from the catheter to the pulse control box 22 of readings from at least one temperature sensor mounted in the tip of the catheter 12. In this embodiment, and in all of the embodiments described herein, the catheter may comprise multiple thermal sensors (for example, thermocouples or thermistors), as described further below. If the catheter comprises multiple temperature sensors mounted in its tip region, the feedback shown in FIG. 1 from the catheter to the pulse control box may be, for example, the highest reading from among all of the individual temperature sensor readings, or it may be, for example, an average of all of the individual readings from all of the temperature sensors.

In FIG. 1, two communication options, represented by double-headed arrow 24 and single-headed arrow 26, are shown for delivering information to the generator 20 or exchanging information between the pulse control box 22 and the generator 20. The communication pathway 18 between the generator 20 and the pulse control box 22 could comprise, for example, multiple, separate electrical connection (not separately shown) between the generator 20 and the pulse control box 22. One of these communication lines could be, for example, a separate (possibly dedicated) line for communicating to the generator the highest temperature measured by any of a plurality of temperature sensors mounted in the catheter tip. This could be used to trigger a temperature-based shutdown feature in the generator for patient safety. In other words, the temperature reading or readings from the catheter may be sent to the pulse control box, which may then feed the highest temperature reading to the generator so that the generator can engage its safety features and shut down if the temperature reading appears to be getting undesirably or unsafely high.

In an alternative configuration, the generator 20 "thinks" it is delivering RF energy to the catheter, but that energy is being delivered instead to the pulse control box 22. The pulse control box then determines, based upon the temperature feedback that it receives from the catheter, whether to drive the catheter at the power level coming from the generator or, alternatively, to pulse the delivery of RF energy to the catheter tip. In this configuration, the generator may be blind to the fact that the pulse control box 22 is determining whether to send power to the catheter tip or to momentarily suspend delivery of energy to the catheter tip as a means of effectively controlling tissue temperature by monitoring and controlling catheter tip temperature.

Figure 2:
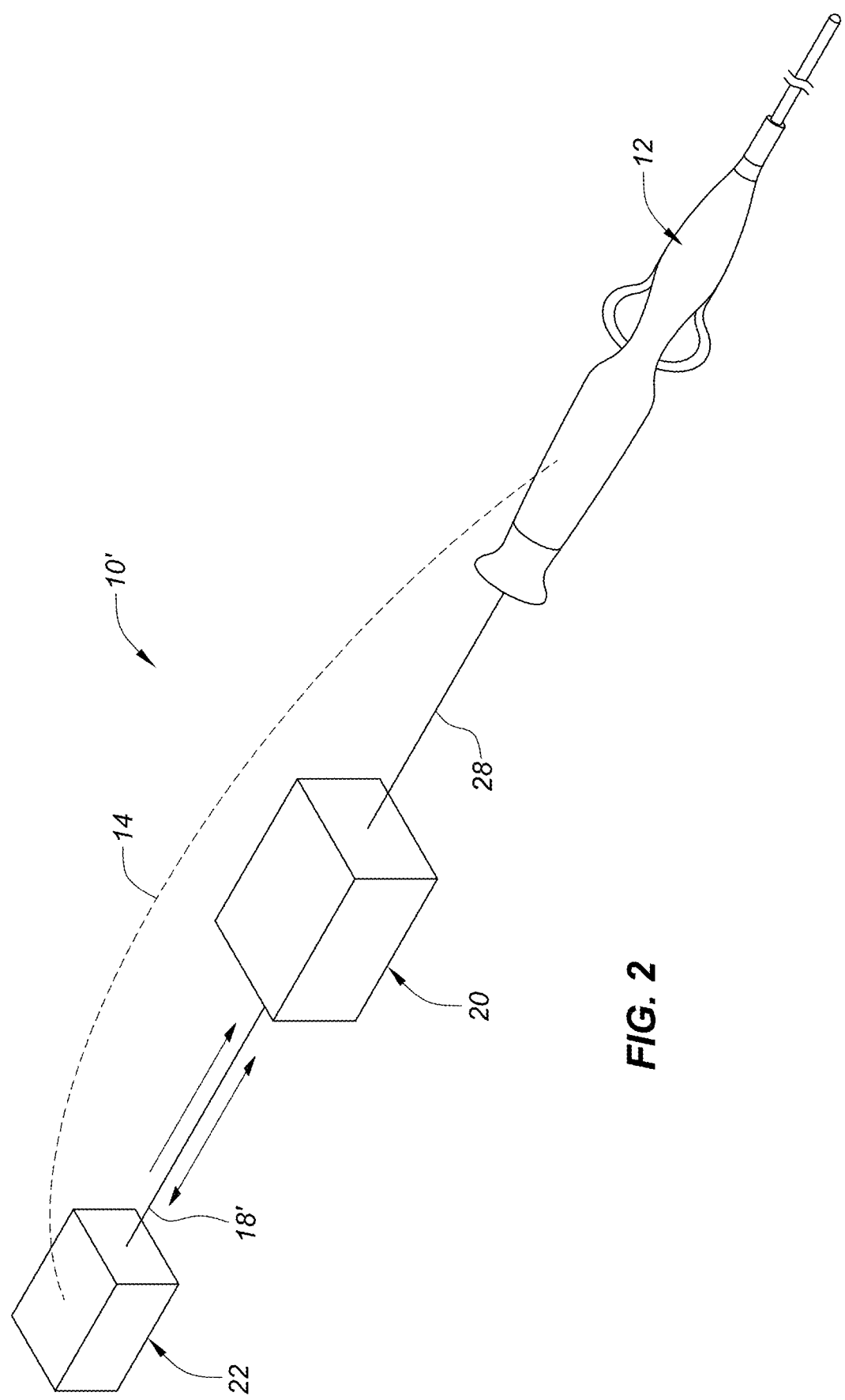
FIG. 2 is similar to FIG. 1, but depicts the components arranged in a slightly different configuration in an alternative embodiment of a system for delivering pulsed RF energy during catheter ablation.

FIG. 2 is similar to FIG. 1, but depicts the components arranged in a slightly different configuration in an alternative embodiment of a system 10' for delivering pulsed RF energy during catheter ablation. In FIG. 2, the pulse control box 22 is again receiving temperature feedback from the catheter 12 along communication pathway 14. However, in FIG. 2, the pulse control box 22 is "telling" the generator (e.g., along communication pathway 18') to switch "off" and "on" based on the sensed temperature from the catheter 12. The generator 20 then delivers pulsed RF energy to the catheter 12 via communication pathway 28. In this system 10' for delivering pulsed RF energy, as in the system 10 depicted in FIG. 1 and discussed herein, the power can remain at a desired power level (e.g., 50 or 60 Watts) rather than being reduced to an ineffective level when excessive temperature is sensed by the catheter tip. In particular, rather than reducing the power to control temperature, the power is delivered in a pulsed manner; and it is the control of the energy pulses, including control of the length of the time gaps between pulses, that is used to control the tip temperature as a surrogate for controlling the tissue temperature. As a further alternative for how the system 10' depicted in FIG. 2 may operate, the generator 20 may receive temperature feedback via communication pathway 28 and then pass temperature feedback information to the pulse control box 22, which would then control the generator 20 as described above.

Figure 3:
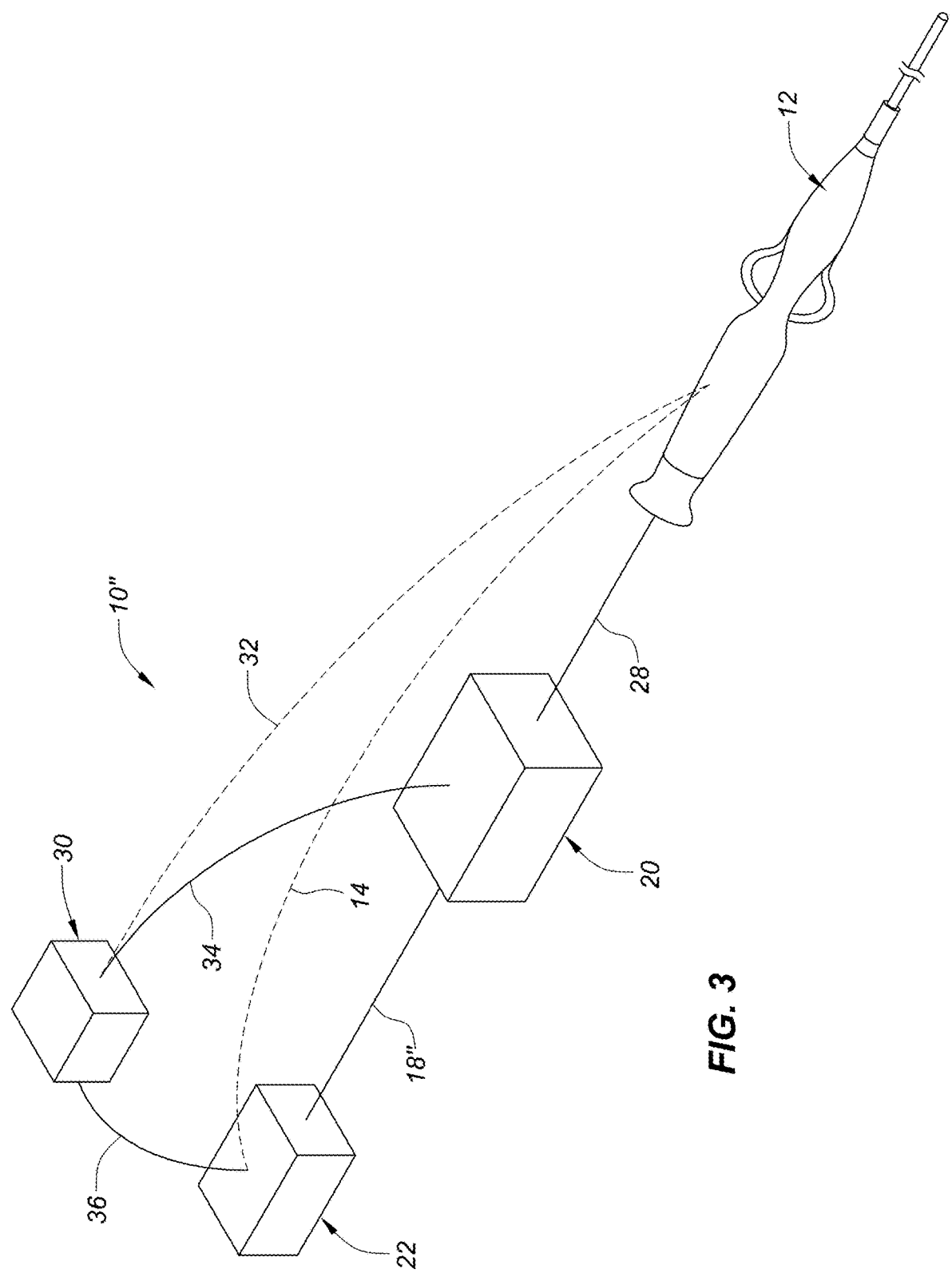
FIG. 3 is similar to FIGS. 1 and 2, but depicts a system with a dedicated central processing unit interfacing with the components also depicted in FIGS. 1 and 2.

FIG. 3 is similar to FIGS. 1 and 2, but depicts a system 10" with a dedicated central processing unit (CPU) 30 interfacing with the components 12, 20, 22 also depicted in FIGS. 1 and 2. As shown in this figure, a dedicated CPU is among the components in the system 10" for delivering pulsed RF energy during ablation. This figure also shows a number of potential communication pathways between and among the various components, including, for example, a temperature feedback pathway 32 between the catheter and the CPU, the temperature feedback pathway 14 between the catheter and the pulse control box 22, a communication pathway 34 between the generator 20 and the CPU 30, a communication pathway 18" between the generator and the pulse control box, the communication pathway 28 between the generator 20 and the catheter 12, and a communication pathway 36 between the CPU and the pulse control box. The following are various possible combinations of pathways that could be used, assuming the overall system comprises at least the four components 12, 20, 22, 30 shown in this figure:

A. 14, 18", 28, 32, 34, 36 (all)
B. 14, 28, 34, 36
C. 14, 34, 36
D. 14, 18", 36
E. 32, 34, 36
F. 18", 32, 36
G. 18", 32, 34
H. 14, 18", 34

As represented by the first set (i.e., set "A" above) of example pathways noted above, all six communication pathways 14, 18", 28, 32, 34, 36 depicted in FIG. 3 could be used in a system for delivering pulsed RF energy during a catheter ablation procedure. Alternatively, and as merely one more example, communication pathways 14, 28, 34, and 36 may be the only four communication pathways required in the control system. This is the second example listed above (i.e., set "B"). In each of these communication pathway examples, it is assumed that the generator 20 is always connected to the catheter 12 in some way (as represented in FIG. 3 by the solid line 28 extending between the generator and the catheter). Thus, in yet another example operating scenario, the generator 20 may directly receive temperature feedback from the catheter 12 along, for example, communication pathway 28. The generator 20 could then share that temperature feedback information with the dedicated CPU 30 and/or the pulse control box 22 via one or more of the communication pathways 18", 34, 36. Yet another possible alternative to the system 10" depicted in FIG. 3 would be to switch the locations of the pulse control box 22 and the generator 20, similar to the configuration depicted in FIG. 1, but also include the dedicated CPU 30 depicted in FIG. 3. In this latter optional configuration, there may be a communication pathway (not shown) directly connecting the pulse control box 22 to the catheter 12 (similar to communication pathway 16 in FIG. 1).

Figure 4:
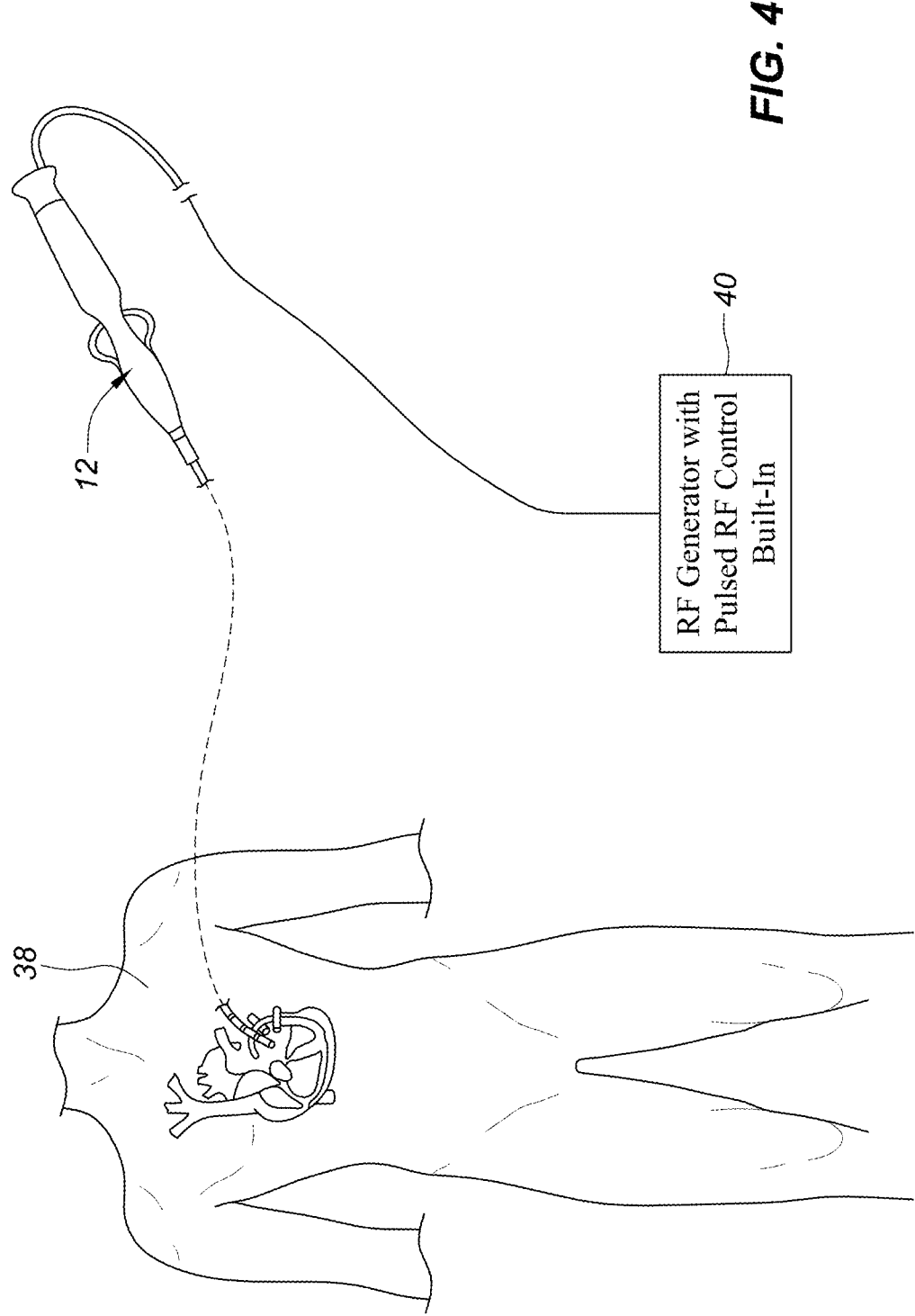
FIG. 4 schematically depicts a catheter in use in a patient and connected to a generator comprising a pulsed RF control system according to the present disclosure.

FIG. 4 schematically depicts a catheter 12 in use in a patient 38 and connected to a generator 40 comprising a pulsed RF control system according to the present disclosure. This figure depicts a portion of a human torso of the patient 38, a heart, a representative catheter tip located in the heart, a representative catheter handle, and the RF generator. As shown in this figure, the catheter is assumed to be connected to the RF generator 40. In this configuration, the pulse control hardware, software, and/or firmware is built into the generator itself.

Figure 5:
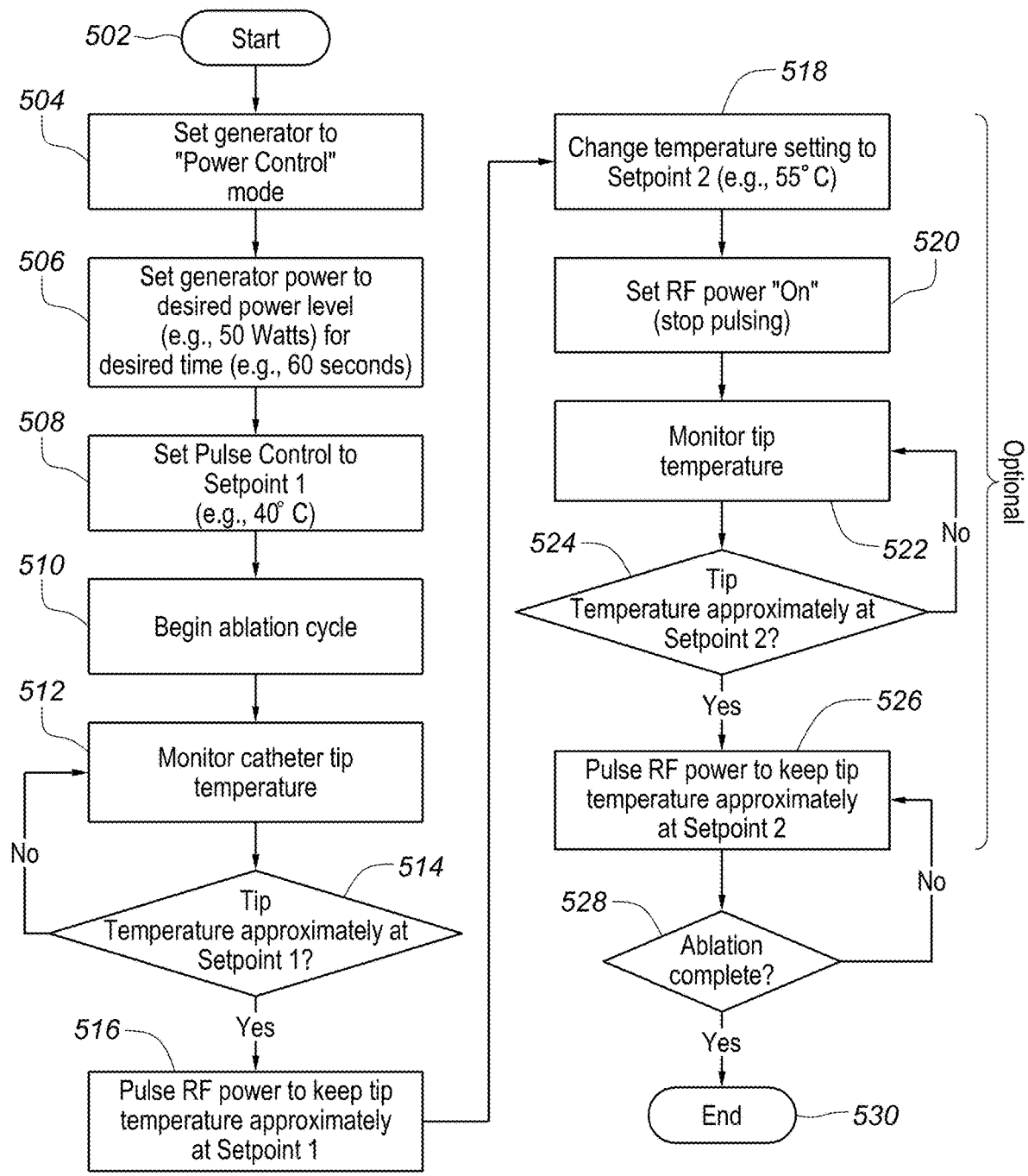
FIG. 5 depicts one possible control flowchart, including various optional steps, for delivering pulsed RF energy to an ablation catheter.

FIG. 5 is a flowchart depicting one possible control flow, including various optional steps, for delivering pulsed RF energy to an ablation catheter. In this representative, and not limiting, example of control flow, the process commences at block 502. At block 504, the generator is placed in a "power-control" mode. Next, at block 506 the generator power is set to a desired power level for a desired initial time. In this representative flowchart, that initial power level is shown as 50 Watts and the initial time is shown as 60 seconds; however, both of these are merely sample values. If, for example, a physician is ablating a portion of the heart that lies near the esophagus, then the physician may choose to use a lower power setting (e.g., 15 Watts) since the physician may desire to create a relatively shallow lesion (e.g., a 1 mm deep lesion). At block 508, the pulse control may be set to set point 1. If, for example, the pulse control box 22 (see, for example, FIG. 1) is a PID controller (also known as a proportional-integral-derivative controller or a three-term controller), set point 1 may relate to the measured process variable (PV). That measured process variable may be the temperature feedback coming from the catheter tip during the ablation cycle. As may be understood by one of skill in the relevant art, a PID controller calculates an error value as the difference between a measured process variable—e.g., measured tip temperature—and a desired set point—e.g., a desired tip temperature. The controller then attempts to minimize the error by adjusting the process through use of a manipulated variable (MV)—e.g., the time that a selected power is actively delivered to an ablation tip. The three parameters in a PID controller are as follows:

1. the proportional value (P)—depends on present error;
2. the integral value (I)—accumulation of past errors; and
3. the derivative value (D)—predictive of future errors based on current rate of change.

In an effort to achieve a gradual convergence to the set point, which, as discussed herein, may be desired catheter tip temperature, the controller calculates a weighted sum of P, I, and D, and then uses that value to adjust the process—here by adjusting the time when RF power is delivered to the ablation tip (e.g., by pulsing the delivery of RF energy to the tip). In one embodiment of the system described herein, a user is allowed to "tune" the three values, namely the P, I, and D values. The controller may be a separate controller as discussed herein and shown in FIGS. 1-3 (e.g., pulse control box 22 in these figures), or may be implemented as a microcontroller or a programmable logic controller (PLC) or in other firmware or software, all of which may be, for example, built directly into the generator 40 as shown in, for example, FIG. 4. In the control systems described herein, RF power is turned "on" and "off" based on the temperature feedback as it is interpreted and analyzed by the pulse control box. In block 510, the ablation cycle begins.

In block 512, the control system monitors the catheter tip temperature. As noted above, this would be the "PV" value in a PID controller. As represented by block 514 and its loop back to block 512, as long as the tip temperature is not close to set point 1, the system continues to permit the delivery of full RF power to the ablation tip and continues to monitor catheter tip temperature at block 512. Once the measured tip temperature is approximately at the value of set point 1 (e.g., 40° C. in one example), the pulse control box (e.g., the PID controller) would begin to pulse the RF energy being delivered to the catheter tip (see block 516) in an effort to keep the tip temperature approximately at set point 1.

Continuing to refer to the flowchart in FIG. 5, at block 518, the temperature setting on the pulse control box 22 is changed to set point 2, which may be, for example, a higher value than set point 1. As shown in FIG. 5, in this example set point 2 is 55° C. At this point in the process, and in order to increase the tip temperature from set point 1 to set point 2, the full RF power may be delivered to the catheter tip (see block 520). In other words, at least initially, the system may stop delivering pulsed RF energy to the ablation tip as the system tries to drive the tip temperature from the set point 1 temperature to the set point 2 temperature. In block 522, the system monitors the tip temperature. In decision block 524, the system compares the temperature at the ablation tip to set point 2. If the tip temperature is not yet approximately equal to the value of set point 2, the system repeatedly returns to block 522 and continues to monitor the tip temperature being reported to the pulse control box. Once the tip temperature is approximately equal to the value of set point 2, control transfers from block 524 to block 526 in FIG. 5.

Block 526 is similar to block 516 and, at this point, the control system begins again to pulse the delivery of RF energy in an effort to keep the tip temperature approximately at set point 2 without overheating the tissue. In decision block 528, the system next attempts to determine whether the ablation is complete (e.g., a physician may stop calling for the delivery of ablation energy). Once it is determined that the ablation is complete (e.g., when, a physician determines that sufficient RF energy has been delivered to the tissue), control transfers to block 530; and all delivery of RF energy to the ablation tip is stopped.

As mentioned, in one of the sample embodiments described herein, the PID controller receives values for set point 1 and set point 2, which may be entered by a user. The PID controller also receives the measured temperature (or multiple measured temperatures if multiple temperature sensors are present) from the catheter tip. The controller then determines when to permit delivery of full power RF energy or pulsed RF energy to the ablation tip, including, in the latter case, the length of the pulses (i.e., the time periods when RF energy is being delivered to the catheter tip) and the length of the time periods when no RF energy is being delivered to the catheter tip. The length of the pulses and the length of the non-pulse time periods may vary continuously. That is, the duration of two adjacent pulses may be different, and the length of two adjacent non-pulse time periods may be different. The PID controller determines algorithmically when to turn the RF power "on" and "off" as it receives real-time (or near-real-time) tip temperature feedback from the ablation catheter.

Figure 6:
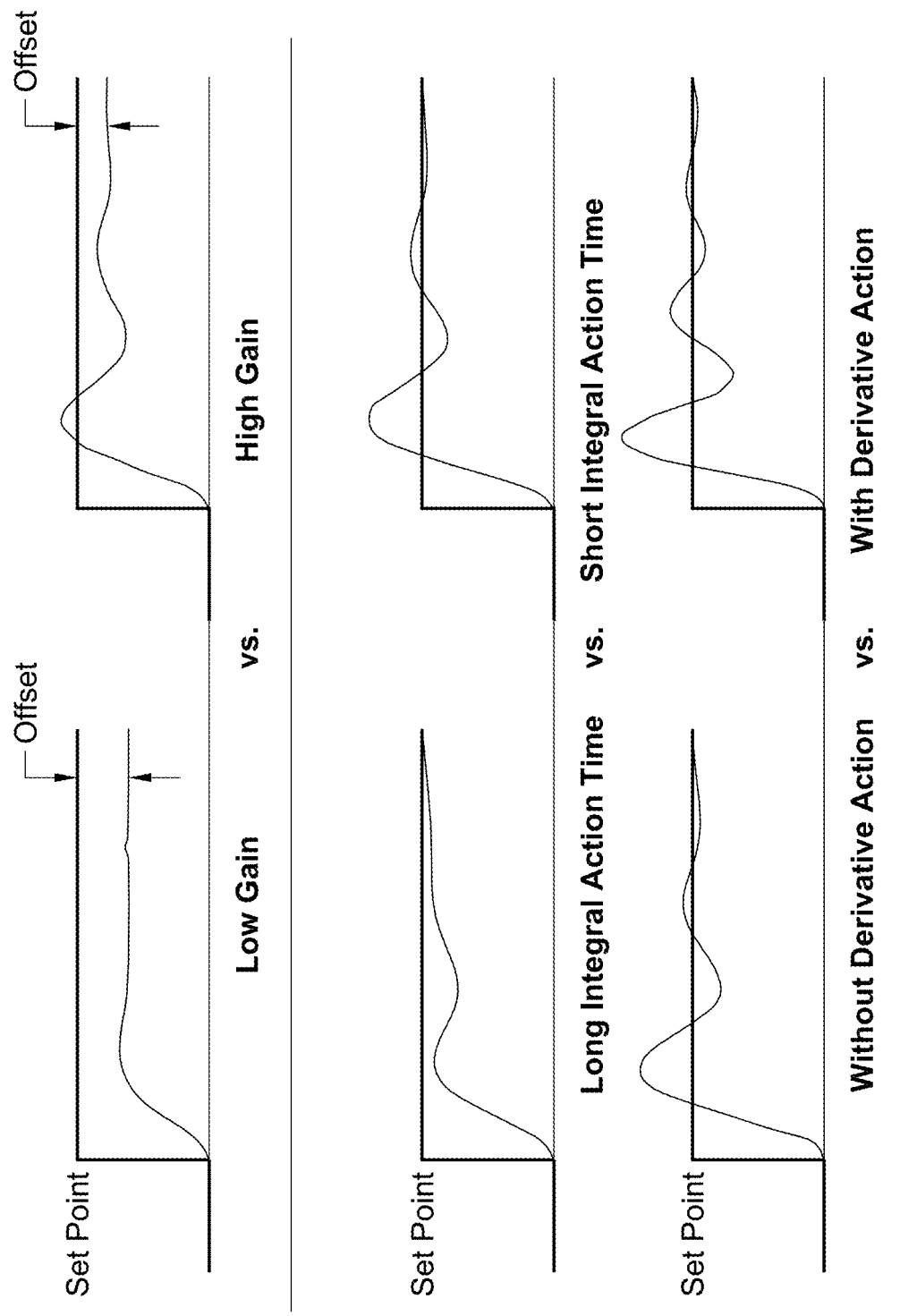
FIG. 6 depicts six representative controller responses, showing how a measured process variable may approach a set point depending on how the controller is configured.

FIG. 6 depicts six representative controller response curves, showing how a measured process variable (which may be the measured tip temperature in the control systems disclosed herein) may approach a set point (which may be the desired tip temperature in the control systems disclosed herein), depending on how the controller is configured. In the ablation controllers discussed herein, the controller response curve labeled "Long Integral Action Time" in FIG. 6 may be a desirable controller response as the tip temperature is driven from its starting temperature to the desired ablation temperature. In particular, in this curve, which is located in the middle of the left three curves in FIG. 6, the temperature would never exceed the set point temperature (e.g., set point 1 or set point 2 in FIG. 5), but would reach the set point temperature in a timely and efficient manner.

Figure 7:
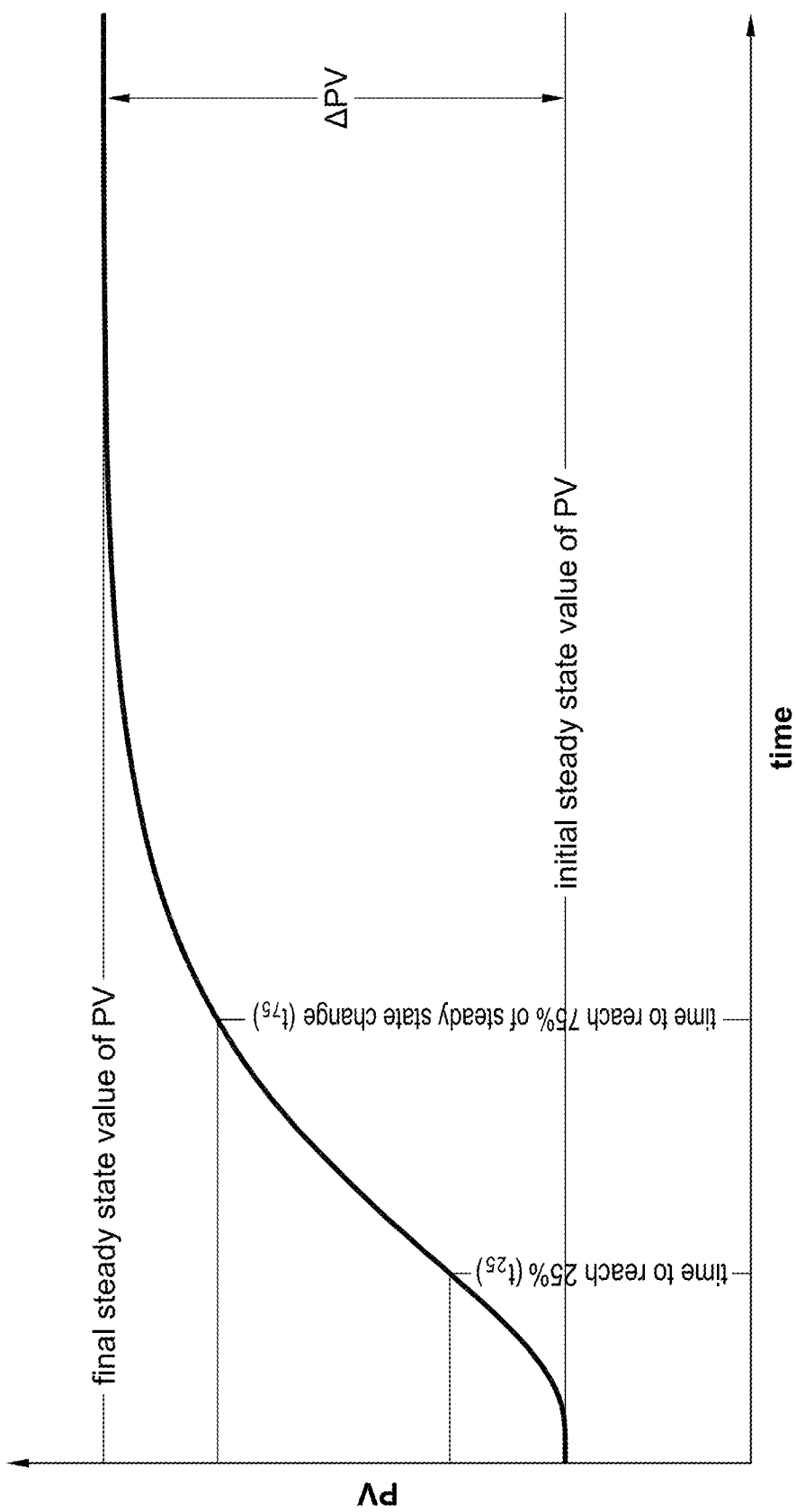
FIG. 7 depicts a representative controller response and depicts how a measured process variable (PV) at a first set point ("initial steady state value of PV") may be driven to a second set point ("final steady state value of PV").

FIG. 7 depicts a representative controller response curve and depicts how a measured process variable (PV) at a first set point ("initial steady state value of PV") may be driven to a second set point ("final steady state value of PV"). This 'dual set point' configuration is represented in the full flowchart of FIG. 5, which is described above. It should be noted, however, that such a dual set point control scheme is not required. In other words, an effective controller could drive the catheter tip temperature directly to the set point ultimately desired, without driving to a first value (e.g., set point 1) and then driving to a second value (e.g., set point 2). Hence, blocks 518-526 are labeled "optional" in FIG. 5. If these five blocks were not present, the "No" decision line from block 528 would go to block 516. The control system would then be configured to drive to a single set point. That said, there are potential advantages to keeping all blocks of the control scheme depicted in FIG. 5. For instance, the control system of FIG. 5 may have some distinct safety advantages. For example, set point 1 could be an initial temperature that is somewhere between the starting temperature of the ablation tip and the ultimate desired temperature for the ablation tip. If the system is able to reach the set point 1 value effectively and while remaining under control, that would provide the user with confidence that the tip is in contact with the tissue and that the controller is working properly before the tip temperature reaches a potentially dangerously-high temperature. Once set point 1 is reached (i.e., where control transitions from block 514 to block 516 in FIG. 5), the user with have confidence that the controller is functioning properly and could then, at block 518 of FIG. 5, input a higher (ultimately desired) working temperature for creating lesions.

To enable the ablation temperature control system described above to work most effectively, it may be desirable to have an ablation tip having a relatively low thermal mass (also known as ablation tip having high thermal sensitivity). If the ablation tip has a relatively low thermal mass, it more rapidly heats (i.e., it comes to temperature quickly) and cools (i.e., it does not remain hot for long after power is removed), enabling tighter control of the tip temperature and less "coasting" of the tip temperature past a desired set point as well as more rapid reduction in tip temperature when RF power is removed from the tip. In fact, such a tip may cool down at the same rate as the tissue, which would inform the user whether the tip became dislodged during ablation. Remaining FIGS. 8-25, which are described further below, depict various embodiments and components of ablation catheter tips that can be used effectively with the pulsed RF control systems described herein. The catheter tips disclosed herein are not necessarily the only tips that could be used with the pulsed RF control systems described herein.

FIG. 8 is a fragmentary, isometric view of various components comprising an embodiment of a tip 42 at the distal end of an ablation catheter that could be used with the pulsed RF control systems disclosed herein. In this embodiment, a conductive shell 44 (e.g., a platinum shell, a platinum iridium shell, or a gold shell) with irrigation ports or holes is present at the most distal end of the catheter components shown in FIG. 8. The conductive shell 44 (which may weigh, for example, 0.027 g) includes a shell distal end portion 48 and a shell proximal end portion 50, which may comprise one or more parts or components. In this particular embodiment, the shell 44 includes six irrigation holes 46, two of which are visible in this isometric view. Also visible in FIG. 8 is an optional shank 52 comprising an annular or washer-shaped brim 54 and a cylindrical open crown 56, which together define the top-hat-shaped shank. In this embodiment, the conductive shell 44 and the shank 52 effectively encase an ablation tip insert 58, the proximal surface 60 of which is partially visible in FIG. 8. An electrical lead wire 62 is shown connected (e.g., by soldering or welding) to the shank 52. Alternatively, the electrical lead wire 62 may be directly connected to the conductive shell 44. A number of lead wire pairs 64 for the temperature sensors comprising part of the tip may be seen extending rearwardly or proximally in FIG. 8. Finally, FIG. 8 also shows two components of an irrigation tube assembly 66 extending proximally in FIG. 8 (i.e., rightwardly in this figure). Although the conductive shell 44 depicted in the figures includes six irrigation holes 46, more or fewer holes may be used, and the size of the holes may be larger, or smaller, or a mix of larger and smaller holes.

Using the control systems described herein, it may be completely unnecessary to irrigate the ablation tip. FIG. 9 is similar to FIG. 8, but the conductive shell 44' depicted in FIG. 9 does not include any irrigation ports or holes through it (compare element 46 in FIG. 8). Thus, this is a non-irrigated catheter tip 42' that could be used in combination with the pulsed RF control systems described herein. Most of the discussion below focuses on the irrigated catheter tip embodiment 42 of FIG. 8, but much of what is said below regarding the embodiment 42 depicted in FIG. 8 applies equally well to the non-irrigated catheter tip embodiment 42' depicted in FIG. 9, with the exception of the discussion of the irrigation features. It should also be noted that, although the irrigation tube assembly 66 (shown in FIG. 8) is not necessary in the non-irrigated catheter tip embodiment 42' depicted in FIG. 9 (and, thus, is not shown in FIG. 9), the irrigation tube assembly 66 could be present on the non-irrigated catheter tip embodiment. Further, as also shown in FIG. 9, the proximal surface 60' of the ablation tip insert of the non-irrigated embodiment 42' may be slightly different from the proximal surface 60 (FIG. 8) of the ablation tip insert 58 (see also FIG. 10) of the irrigated embodiment 42 (FIG. 8). In particular, the proximal surface 60' may not include the main channel 84, which is discussed further below in connection with FIG. 10. The non-irrigated embodiment of FIG. 9 could, however, just as easily use the same ablation tip insert 58 and the irrigation tube assembly 66 shown in the irrigated catheter tip embodiment 42 of FIG. 8, which would make it possible, for example, to manufacture both irrigated and non-irrigated embodiments on a single assembly line, and would likely result in the two embodiments exhibiting more similar structural integrity during use.

Figure 10:
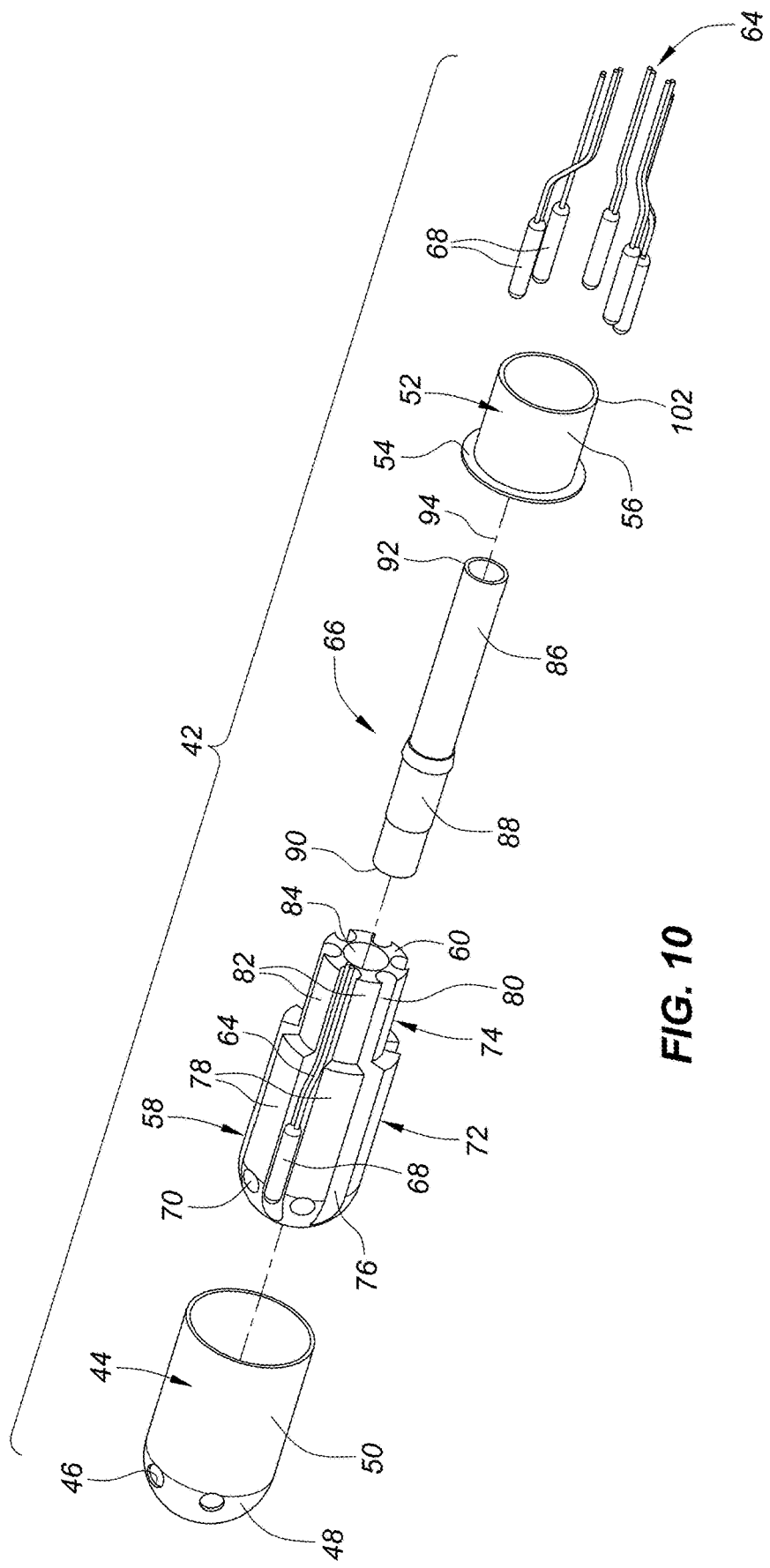
FIG. 10 is an exploded, isometric view of the catheter tip depicted in FIG. 8, showing additional components and features.

FIG. 10, which is an exploded, isometric view of the catheter tip 42 depicted in FIG. 8, is described next, starting with the elements shown in the upper left-hand portion of that figure and working toward the lower right-hand portion of the figure. FIG. 10 again depicts the conductive shell 44, but this time exploded away from the other components of the tip shown in FIGS. 8 and 10, thereby revealing additional features and components. To the right of the conductive shell in FIG. 10 is an assembly of an ablation tip insert 58 and one temperature sensor 68 (e.g., a thermocouple). As may be seen in FIG. 10, the tip insert 58 includes a plurality of lateral irrigation channels 70 that are sized and arranged to align with complementary irrigation holes 46 through the conductive shell 44. To facilitate assembly, the diameter of the lateral irrigation channels 70 in the tip insert 58 may be smaller than the complementary holes 46 through the conductive shell 44. Thus, it would be less critical to precisely align the lateral irrigation channels with the holes through the conductive shell during manufacturing, and the exiting irrigant would have less of an opportunity to contact the conductive shell before reaching a blood pool.

The tip insert, which may be a unitary piece, includes a main body 72 and a stem 74. The tip insert 58 can be constructed from, for example, plastic (such as PEEK, which is polyether ether ketone) or thermally-insulative ceramic. In the depicted embodiment, the main body portion 72 includes a plurality of optional, longitudinally-extending sensor channels or ditches 76. In FIG. 10, a thermal sensor 68 is shown mounted in one of these ditches 76. Each of the sensor ditches is separated from the next adjacent sensor ditch by a longitudinally-extending shell seat 78. The plurality of shell seats between the sensor ditches are configured to ride against, or very near to, the inner surface of the conductive shell 44. Similarly, the stem 74 of the tip insert 58 defines a plurality of longitudinally-extending wire channels or ditches 80 separated by a plurality of longitudinally-extending shank seats 82. The ditches 76, 80 are configured to carry temperature sensor lead wires on their path to the proximal end of the catheter. The shank seats 82 are sized and configured to ride against, or very near to, the inner surface of the cylindrical open crown portion 56 of the shank 52. The tip insert 58 includes a main channel 84 having a circular cross-section that, as shown in the figures and as described further below, may include more than one inner diameter.

Downward to the right of the tip insert 58 in FIG. 10 is an irrigation tube assembly 66. The irrigation tube assembly comprises, in this embodiment, a central irrigation tube 86 and an optional seating sleeve 88. The central irrigation tube 86 has a distal end 90 and a proximal end 92 and may be constructed from a polymer, such as polyimide. This central irrigation tube may extend proximally toward a catheter handle, or may extend proximally all the way to the catheter handle. The optional seating sleeve 88, as shown in the embodiment depicted in FIG. 10, may include a cylindrical portion and a frustoconical boss. The seating sleeve may be positioned at a desired longitudinal location along the outer surface of the central irrigation tube 86 and then may be fixed in place (for example, by an adhesive or sonic welding or via some other technique). The irrigation tube assembly would then be mounted in the tip insert by, for example, adhesive. If the optional seating sleeve is not included (e.g., to simplify tip construction and manufacturing), the central irrigation tube 86 could be adhered directly to the tip insert 58. To the right of the irrigation tube assembly in FIG. 10 is the optional shank 52. Details of the shank are described further below in connection with, for example, FIG. 14. To the right of the shank are five additional temperature sensors 68. In particular, in this particular embodiment of the tip, six temperature sensors are radially disposed symmetrically about the catheter longitudinal axis 94 (see, for example, FIG. 8). Since one of those six thermal sensors is depicted already in position on the tip insert 58 in FIG. 10, the remaining five temperature sensors are shown in the lower right-hand portion of FIG. 10, oriented and arranged so as to slip into the remaining five complementary sensor ditches 76 formed in the tip insert.

Figure 11:
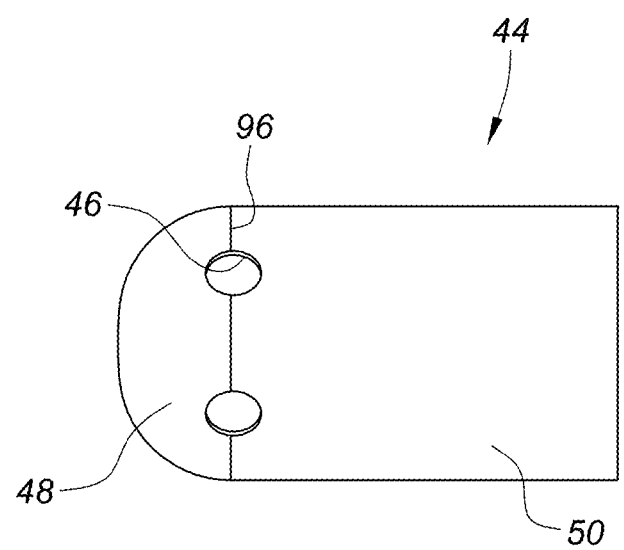
FIG. 11 is a side view of the conductive shell depicted in, for example, FIGS. 8 and 10.
Figure 12:
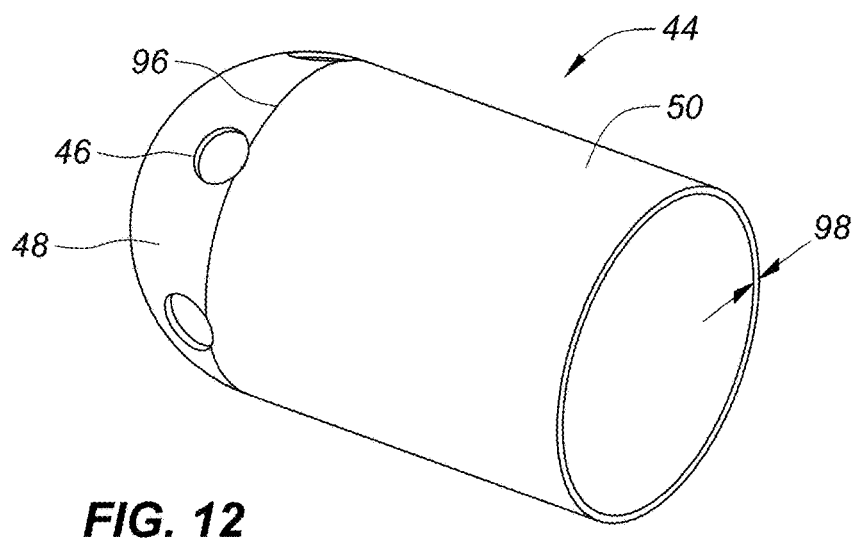
FIG. 12 is an isometric view of the conductive shell depicted, for example, in FIGS. 10 and 11.
Figure 13:
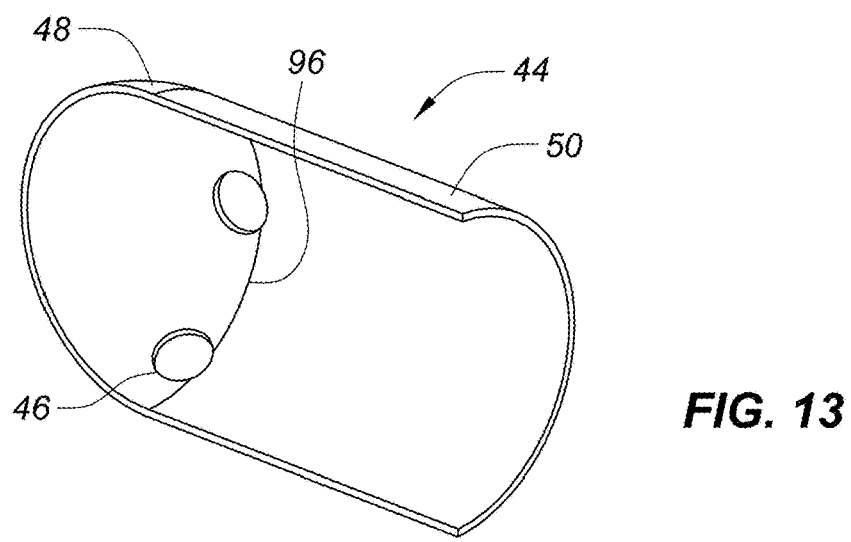
FIG. 13 is a cross-sectional view showing the interior of the conductive shell depicted in, for example, FIGS. 10-12.

FIGS. 11-13 are additional views of the conductive shell 44 depicted in, for example, FIGS. 8 and 10. As shown in these figures, the conductive shell may comprise a hemispherical or nearly-hemispherical domed distal end 48 and a cylindrical body 50. In the figures, a 'seam' 96 is shown between the domed distal end 48 and the cylindrical body 50. This may be merely a circumferential transition line between the cylindrical body and the domed distal end of a unitary component; or, alternatively, it may be the location where the cylindrical body is connected to the domed distal end by, for example, welding. In one embodiment, the wall thickness 98 of the shell is 0.002 inches, but alternative wall thicknesses also work. The conductive shell could be formed or manufactured by, for example, forging, machining, drawing, spinning, or coining. Also, the conductive shell could be constructed from molded ceramic that has, for example, sputtered platinum on its external surface. In another alternative embodiment, the conductive shell could be constructed from conductive ceramic material.

Figure 14:
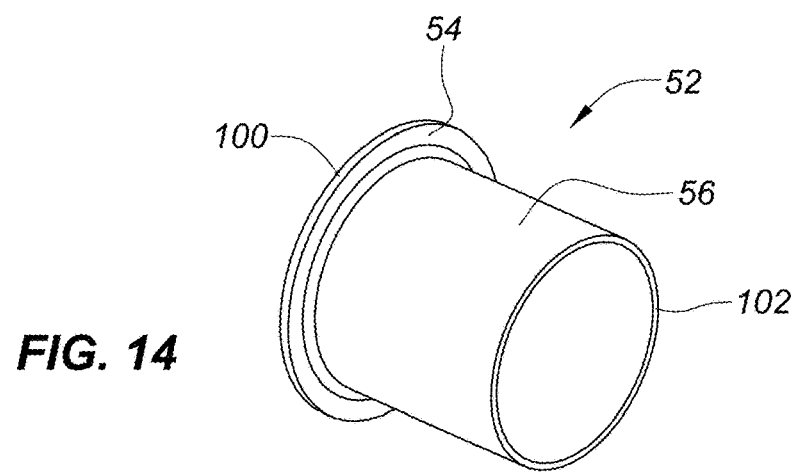
FIG. 14 is an enlarged isometric view of the shank also depicted in, for example, FIGS. 8-10.

FIG. 14 is an enlarged, isometric view of the shank 52 also depicted in, for example, FIGS. 8-10. The brim 54 may include a circumferential outward edge 100 that, as described below, may be connected by welding or soldering to a surface (e.g., the inner surface) of the cylindrical body 50 of the conductive shell. The shank includes a cylindrical open crown 56 that also defines an inner surface. As described above, the inner surface of the cylindrical open crown is sized and configured to slide over the shank seats 82 defined on the stem of the tip insert 58. The cylindrical open crown of the shank also defines a proximal end or edge 102.

Figure 15:
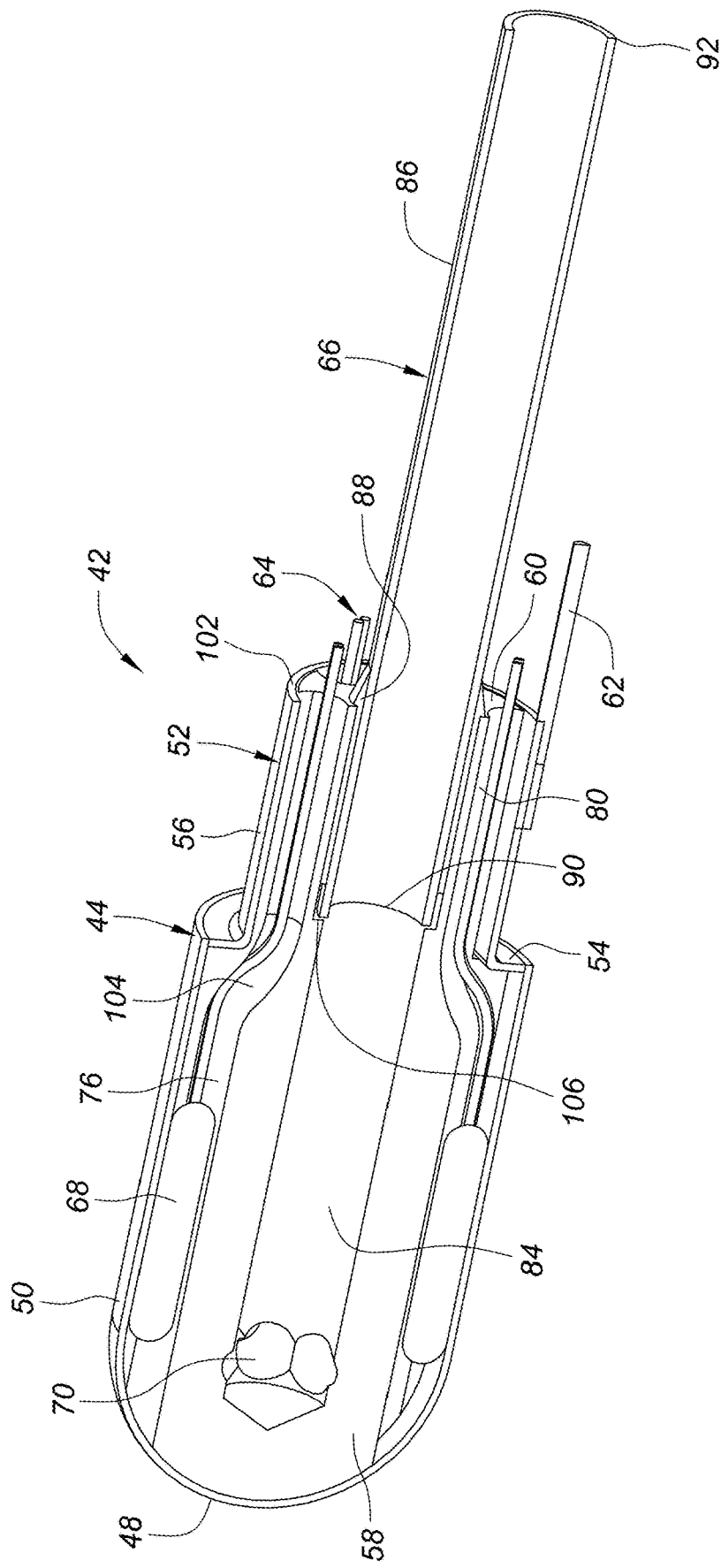
FIG. 15 is an isometric, cross-sectional view of the various catheter tip components also depicted in FIG. 8.

FIG. 15 is an isometric, cross-sectional view of various components of the catheter tip 42 also depicted in FIG. 8 and clearly shows two temperature sensors 68 mounted in their respective temperature sensor ditches 76. As may be clearly seen in this figure, the sensor ditches may include a wire ramp 104 that allows the thermal sensor lead wires 64 to transition from the sensor ditches 76 (formed in the main body of the tip insert) to the wire ditches 80 (formed in the stem of the tip insert). In this configuration, the circumferential outer edge 100 of the brim 54 of the shank 52 is shown riding against the inner surface of the cylindrical body of the conductive shell 50. The shank may be welded or soldered to the conductive shell at this interface to ensure good electrical contact between the shank and the shell. In particular, since the tip electrode lead wire 62 may be electrically connected to the cylindrical open crown 56 of the shank 52 in this embodiment, the shank must be conductively connected to the conductive shell 44 in a manner that permits transfer of energy from the tip electrode lead wire 62 to the shank 52 and then to the conductive shell 44.

Looking more closely at the irrigation tube assembly 66 shown in FIG. 15, it is possible to see that the distal end 90 of the central irrigation tube 86 rides against an inner annular ledge 106 formed as part of the tip insert 58. Further, the frustoconical boss defines a distally-facing ledge or lip that rides against the distal end of the stem 74 of the tip insert 58. Thus, the irrigation tube assembly seats against both the proximal surface 60 of the tip insert 58 as well as the inner annular ledge 106 defined along the longitudinal irrigation channel 84 extending through most of the tip insert 58. It should be noted that when the temperature sensors are in place in the tip insert, when the irrigation tube assembly is mounted in the tip insert, and when the conductive shell and the shank are in position, any voids in the assembled tip (other than the lateral irrigation channels 70) may be filled with potting material, providing a durable assembled set of components. It should also be noted that the outer surface of the temperature sensors are mounted so as to at least be in close proximity to, and preferably so as to be in physical contact with, the inner surface of the conductive shell 44. As used herein, "in close proximity to" means, for example, within 0.0002 to 0.0010 inches, particularly if a conductive adhesive or other bonding technique is used to bond the temperature sensors to the inner surface of the shell. Depending on the specific properties of the sensors, the construction and materials used for the shell, and the type of conductive adhesive or the other bonding technique employed, it is possible that enough temperature sensitivity may be achieved despite even larger gaps between the sensors and the conductive shell, as long as the sensors are able to readily sense the temperature of the tissue that will be touching the outer surface of the conductive shell during use of the catheter tip. Also, the distal end portions of the sensor ditches 76 may be shallower than the proximal end portions of the sensor ditches. In this manner, when a temperature sensor 68 is mounted in its respective sensor ditch, the distal most portion of the temperature sensor is "lifted" toward and possibly against the inner surface of the cylindrical body of the conductive shell 44. This helps to establish good thermal conductivity between the conductive shell and the thermal sensor or sensors mounted inside of the shell.

Figure 18:
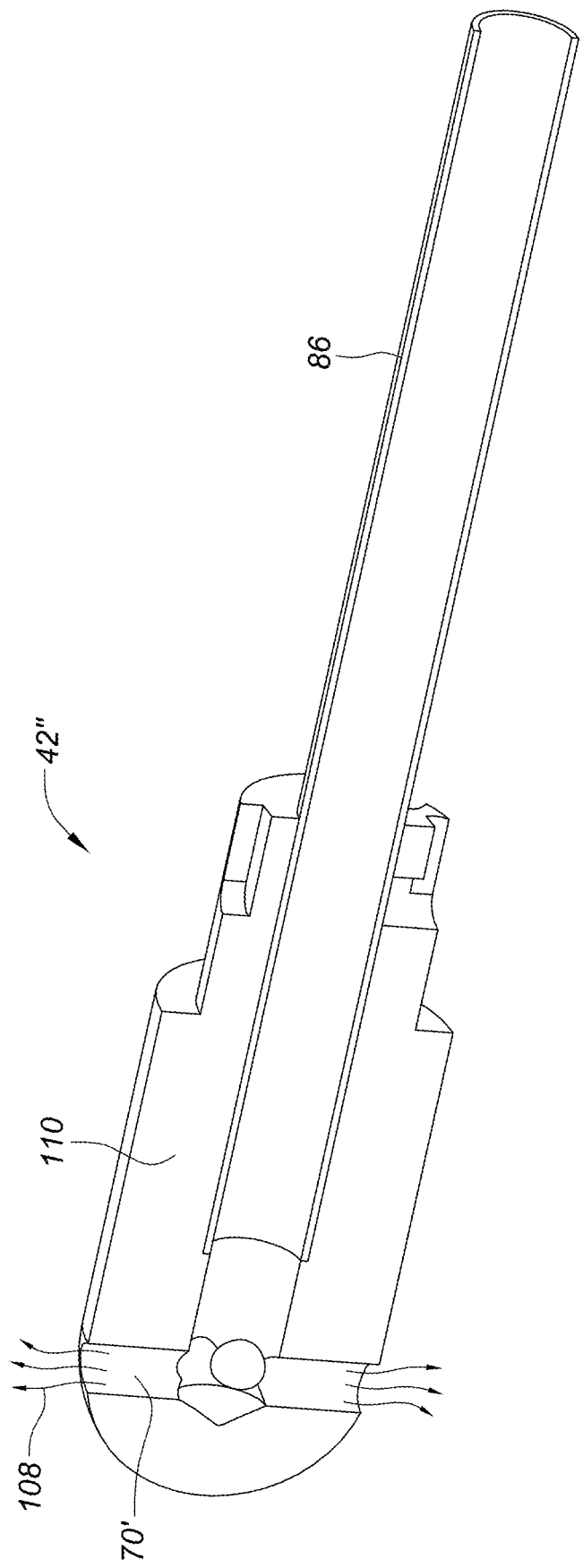
FIG. 18 is a fragmentary, isometric, cross-sectional view of a prior art, solid platinum (or solid platinum iridium) irrigated catheter tip with a polymer irrigation tube mounted in its proximal end.

FIG. 16 is similar to FIG. 15, but is a cross-sectional view taken at a slightly different angular orientation from that shown in FIG. 15, to thereby reveal two of the lateral irrigation channels 70 configured to deliver irrigant 108 outside of the tip 42. Since the conductive shell is very thin in these embodiments, and since the tip insert is constructed from an insulative material, the irrigant, when used, has very little ability or opportunity to influence the temperature of the conductive shell 44. As shown to good advantage in FIG. 16, the irrigant exiting the lateral irrigation channels touches the inner edges of the holes 46 through the conductive shell before exiting to the surrounding blood. This may be contrasted to what is shown in FIG. 18, which depicts a prior art catheter tip 42". In particular, FIG. 18 depicts a solid platinum (or platinum iridium) tip 110 with a polymer irrigation tube 86 mounted in it. In this solid platinum tip (which may weigh, for example, 0.333 g), the irrigant 108 flows through and directly contacts a portion of the platinum tip before reaching the lateral irrigation channels 70' and then exiting the tip. Thus, there is a relatively extended period of time where the cool irrigant rides directly against the platinum comprising the conductive tip. Thus, in the embodiment depicted in FIG. 18, the irrigant has a much greater opportunity to influence the temperature of the tip than does the irrigant in the embodiment depicted in, for example, FIG. 16.

Also, during ablation with a solid platinum tip 110, essentially the entire tip must heat up before a sensor embedded in the tip senses a temperature rise. Thus, not only does the portion of the tip in contact with the tissue being treated heat up, but also the entire tip gets hot, even portions of the tip that are remote from the tissue being treated. Blood flow around the entire solid platinum tip robs heat from the tip, which further distorts the temperature sensed by a sensor embedded in the solid platinum tip; and temperature averaging issues may come into play. For at least these reasons, the temperature sensor embedded in a solid platinum tip is less capable of accurately reporting the temperature in the immediate vicinity of the tissue being treated. In contrast, in embodiments such as the one depicted in FIGS. 15 and 16, with a relatively thin conductive shell 44 surrounding an insulative tip insert 58, the temperature of the conductive shell in the immediate vicinity of the tissue-tip interface heats up quickly, and the sensor 68 closest to that portion of the conductive shell rapidly senses and reports a temperature rise in the immediate vicinity of the tissue-tip interface. It is not necessary for the entire tip to heat up before the sensor can report a temperature rise in the tissue, the blood flowing around the entire tip thus has less of an opportunity to distort the sensed tip temperature, and fewer temperature averaging issues come into play.

FIG. 17 is an enlarged, fragmentary, cross-sectional view showing one possible interconnection between the cylindrical body 50 of the conductive shell 44, the shank 52, and the RF lead wire 62. As shown in this figure, a proximal edge 112 of the cylindrical body 50 of the conductive shell is bent around the circumferential outward edge 100 of the shank brim 54. The shank brim and the shell body are then connected by welding or soldering, for example. Thus, energy coming from the RF lead wire 62 can be delivered to the shank crown 56, conducted to the shank brim 54, and then delivered to the cylindrical body 50 of the conductive shell.

Figure 19:
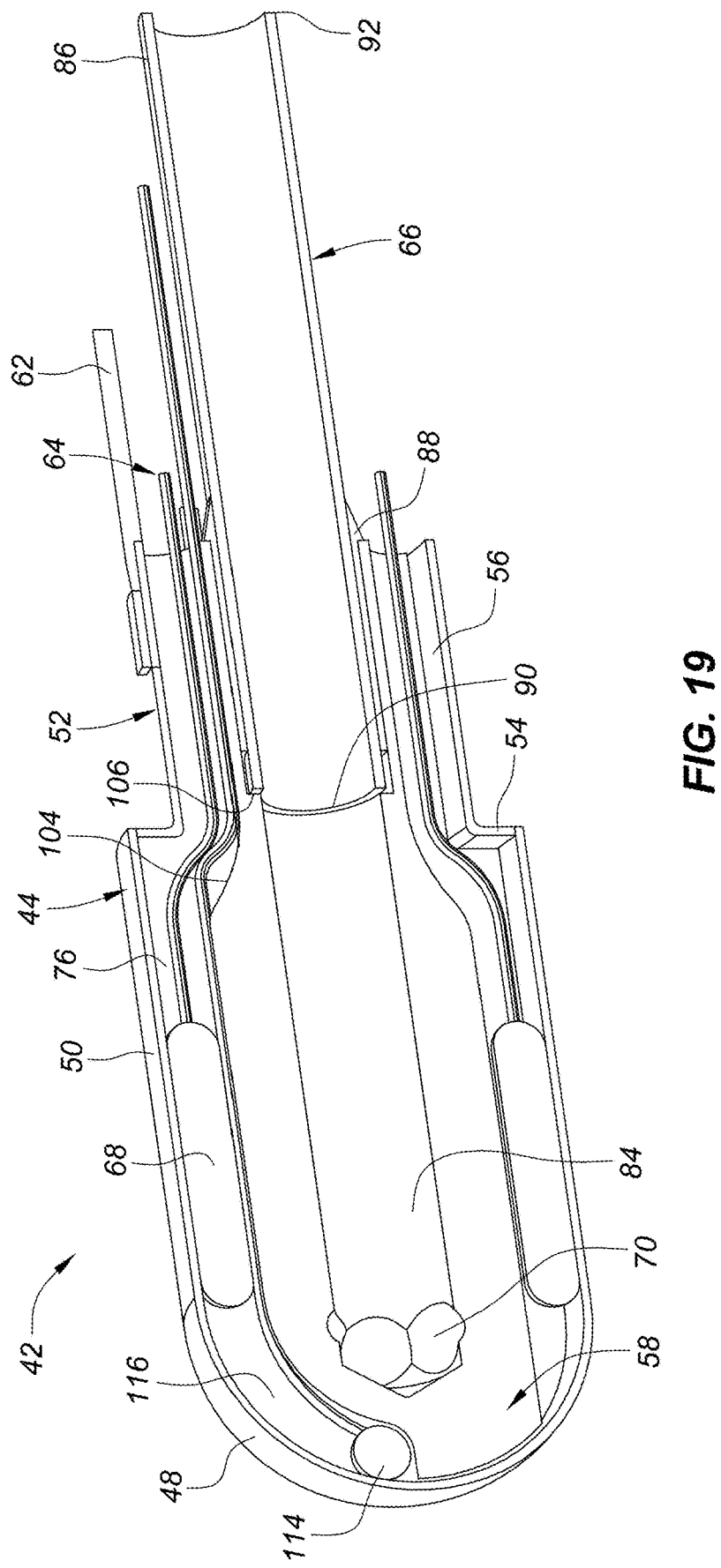
FIG. 19 is similar to FIGS. 15 and 16, and depicts another fragmentary, isometric, cross-sectional view, but this time taken from an angular orientation that clearly shows a distal-most thermal sensor.

FIG. 19 is similar to FIGS. 15 and 16, and depicts another fragmentary, isometric, cross-sectional view, but this time taken from an angular orientation that clearly shows a distal-most thermal sensor 114. In particular, this figure clearly depicts an arc-shaped channel extension 116 extending from one of the sensor ditches 76. As shown in this embodiment, the distal-most thermal sensor (i.e., a seventh thermal sensor in this embodiment) can thus be placed very near to the most distal portion of the tip 42. This distal-most thermal sensor is shown having a spherical shape in FIG. 19 and being placed ahead of (i.e., distally of) one of the radially-disposed thermal sensors 68.

Figure 20:
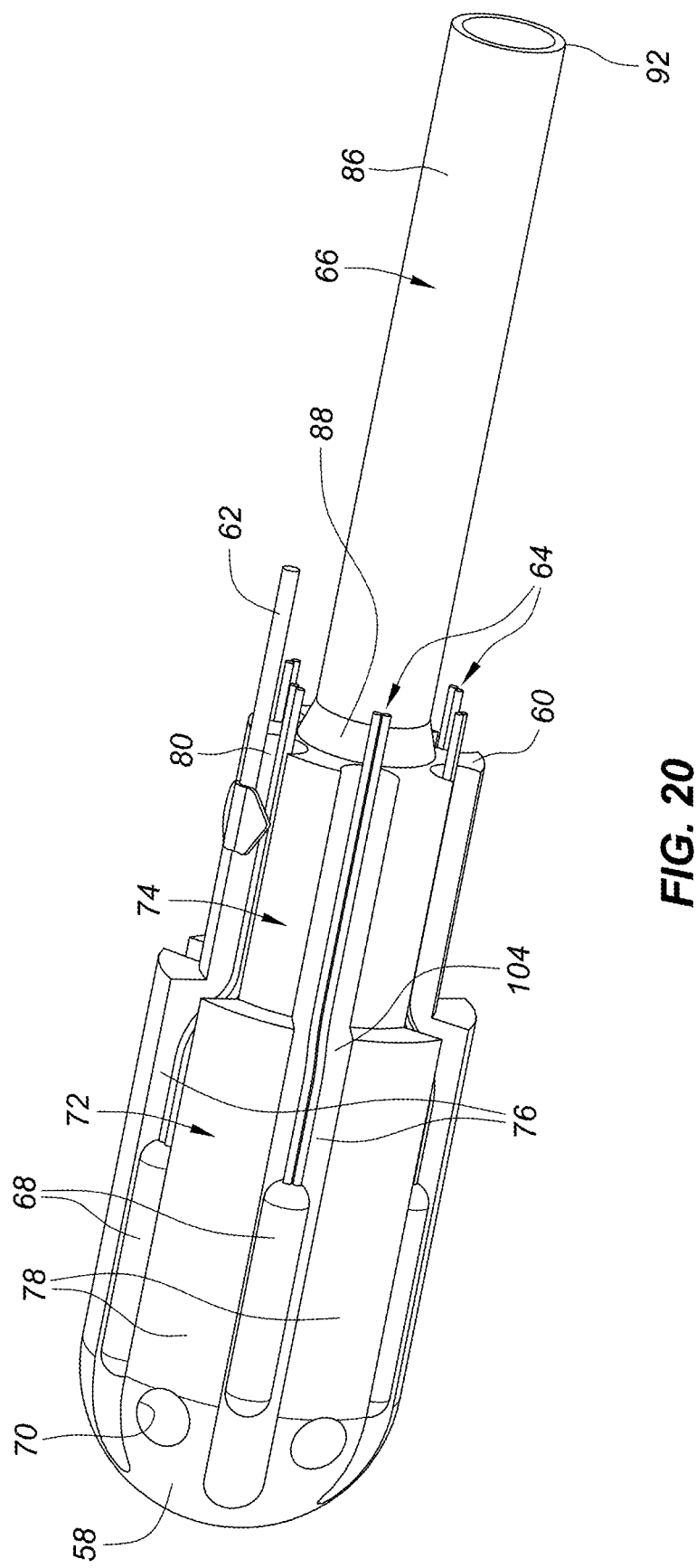
FIG. 20 is an isometric view of components of the tip also depicted in, for example, FIGS. 8, 10, 15, 16, and 19.

FIG. 20 is an isometric view of components of the tip also depicted in, for example, FIGS. 8, 10, 15, 16, and 19. In this figure, all six of the radially-disposed thermal sensors 68 are in place in their respective sensor ditches 76. The seventh, distal-most thermal sensor may also be in place, but is not shown in this particular figure. This figure also clearly shows the frustoconical boss comprising part of the optional seating sleeve 88 with its distally-facing surface or tip resting against the proximally-facing surface 60 of the tip insert 58.

Figure 21:
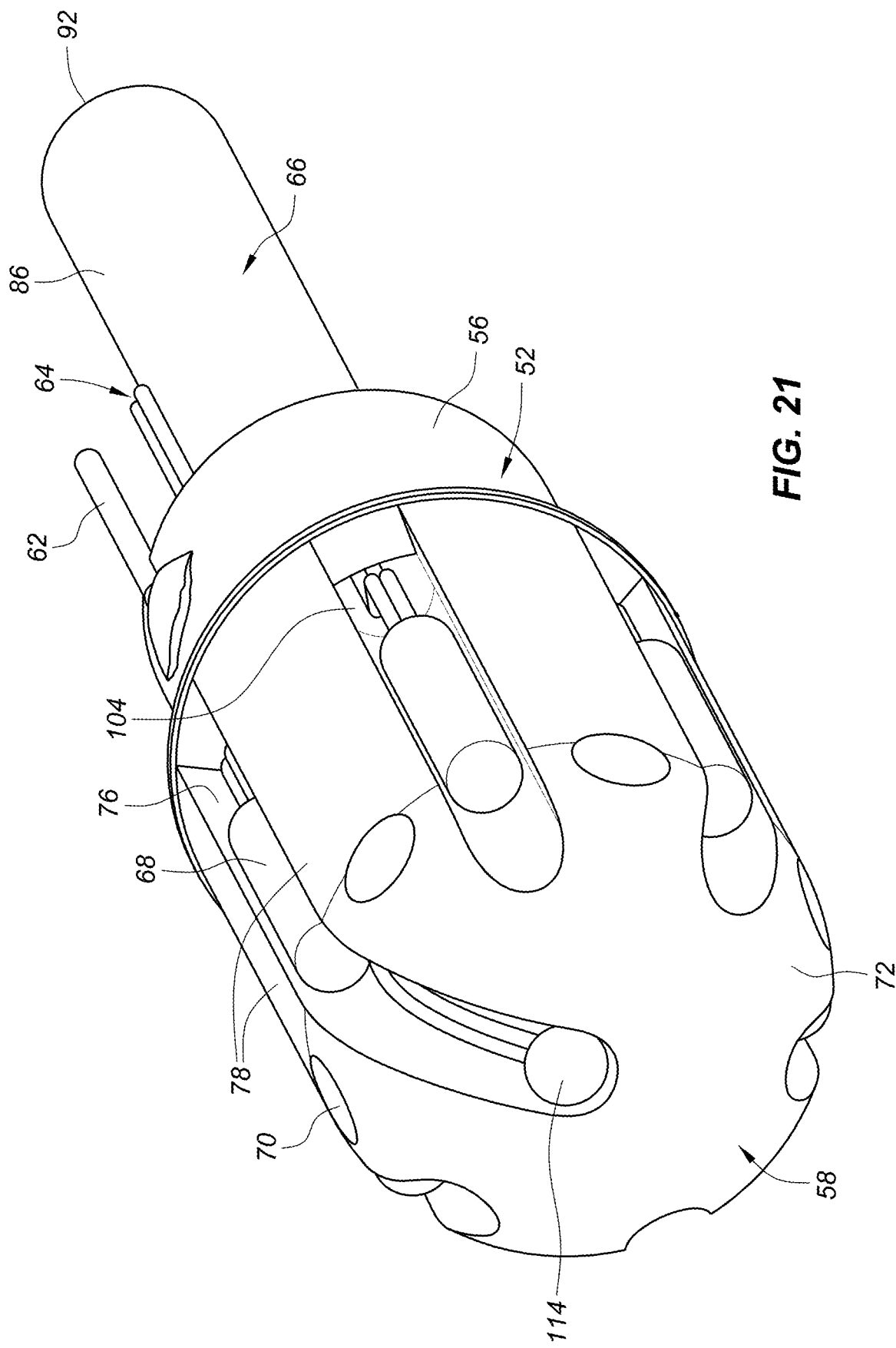
FIG. 21 is similar to FIG. 20, but shows the catheter tip components in a different orientation, revealing the distal-most thermal sensor; and this view also includes the shank, which is not present in FIG. 20.

FIG. 21 is similar to FIG. 20, but shows components of the catheter tip from a different view, wherein the distal-most thermal sensor 114 (i.e., the seventh thermal sensor in this embodiment) is visible, and this view also includes the shank 52, which is not present in FIG. 20. In FIG. 21, the shank is in place over the stem of the tip insert, which helps clarify the benefit of the wire ramps 104 connecting the sensor ditches 76 to the wire ditches, both of which are formed in the tip insert.

Figure 22:
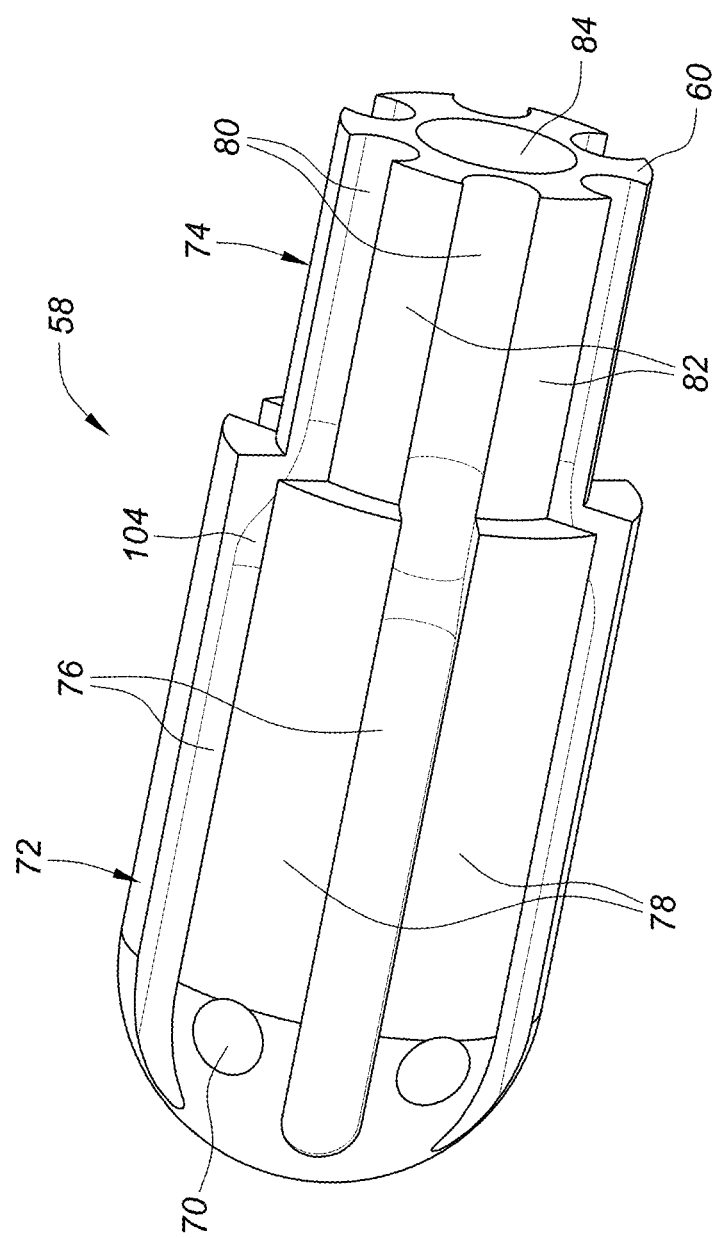
FIG. 22 is an isometric view of the thermally-insulative ablation tip insert also depicted in FIG. 21.

FIG. 22 is an isometric view of just the thermally-insulative ablation tip insert 58 also depicted in FIG. 21, but without any other tip components. All of the ablation tip inserts described herein are preferably constructed from thermally-insulative material. They could be constructed from, for example, ULTEM. In this particular embodiment, the tip insert includes six laterally-extending irrigation channels 70, each of which has a longitudinal axis arranged substantially perpendicular to the longitudinal axis of the tube channel that is itself arranged substantially parallel to the catheter longitudinal axis 94. The laterally-extending irrigation channels connect a distal end of the tube channel 84 to an outer surface of the tip insert. It should be noted that the laterally-extending irrigation channels could be arranged at a different angle (i.e., different from 90°) relative to the tube channel longitudinal axis. Also, more or fewer than six laterally-extending irrigation channels may be present in the tip insert. Again, the outer surface of the tip insert may define a plurality of sensor ditches 76, and these ditches may be separated by a plurality of shell seats 78. These sensor ditches may be, for example, 0.010 inches deep. The shell seats, as described above, may be configured to ride against, or very near to, the inner surface of the conductive shell. A few of the sensor wire ramps are also clearly visible in FIG. 22. As previously described, the stem 74 of the tip insert may define a plurality of wire ditches 80 separated by a plurality of shank seats 82 as shown in FIG. 22.

Figure 23:
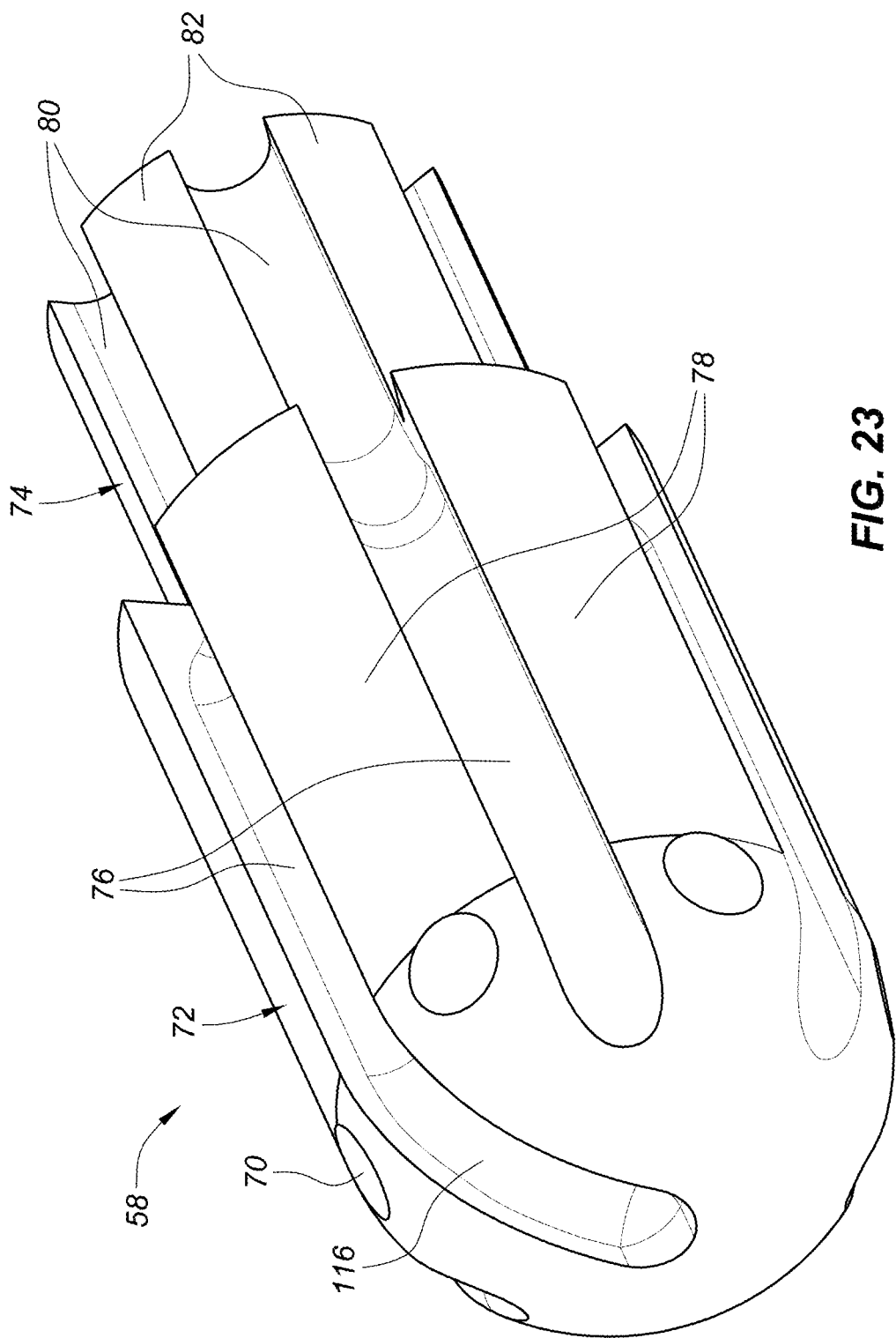
FIG. 23 depicts the tip insert of FIG. 22 in a slightly different angular orientation, revealing an arc-shaped channel or ditch that extends toward the distal end of the catheter tip to position the distal-most thermal sensor at that location.

FIG. 23 depicts the tip insert 58 of FIG. 22 in a slightly different orientation, revealing the arc-shaped channel 116 (or sensor ditch extension) that extends toward the distal-most end of the catheter tip to position the distal-most thermal sensor 114 (see, for example, FIG. 21) at that location. It should be kept in mind that this arc-shaped channel extension need not be present. It has been determined, however, that a number of advantages may be realized by positioning a thermal sensor as far distally on the catheter tip as possible. For example, in view of the rapid heat dissipation experienced by these catheter tips, it can be extremely helpful to sense temperature at this distal location since it may be in the best location for most accurately determining the temperature of the surrounding tissue during certain procedures.

Figure 24:
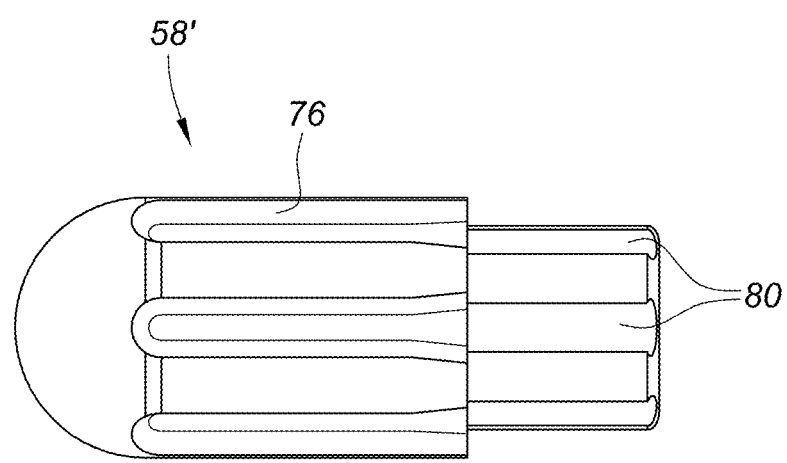
FIG. 24 depicts a thermally-insulative ablation tip insert for a non-irrigated embodiment of a catheter tip, such as the embodiment depicted in FIG. 9.

FIG. 24 depicts an alternative thermally-insulative ablation tip insert 58'. This tip insert could be used in a non-irrigated embodiment of the catheter tip 42', such as the embodiment depicted in FIG. 9. In particular, as discussed above, the control systems for delivering pulsed RF to ablation catheters described herein may completely eliminate the need for the use of irrigation. With that in mind, FIG. 24 depicts one possible configuration for a tip insert for use in a non-irrigated ablation catheter. This embodiment of the tip insert still includes sensor ditches 76 and sensor wire ditches 80 as described above.

Further, it should be understood that, in other embodiments of the thermally-insulative ablation tip insert (both irrigated and non-irrigated embodiments), there may be more or fewer sensor ditches 76. In fact, although the sensor ditches may facilitate placement of the sensors 68 on the insert (e.g., during catheter assembly), the outer surface of the main body of the tip insert may be smooth (or at least ditchless). In such an embodiment, the sensors may be aligned on the smooth outer surface of the tip insert (and, possibly, held in place by, for example, adhesive). Then, when the conductive shell is in place around the tip insert and the sensors 68 are in place between the outer surface of the tip insert and the inner surface of the conductive shell, the gaps or voids between the inner surface of the conductive shell and the outer surface of the tip insert may be filled with material (e.g., potting material or adhesive). It is worth noting that the sensors may be put in place before or after the conductive shell is placed over the tip insert. For instance, the sensors may be mounted on (e.g., adhered to) the smooth outer surface of the tip insert forming a tip-insert-sensor subassembly. Then, the conductive shell may be placed over that tip-insert-sensor subassembly before the remaining voids between the tip-insert-sensor subassembly and the conductive shell are filled. Alternatively, the conductive shell may be held in place over the tip insert while one or more sensors are slid into the gap between the outer surface of the tip insert and the inner surface of the conductive shell. Subsequently, the voids could again be filled. These alternative manufacturing techniques apply to all of the disclosed embodiments that comprise sensors mounted between a tip insert and a conductive shell member.

Figure 25:
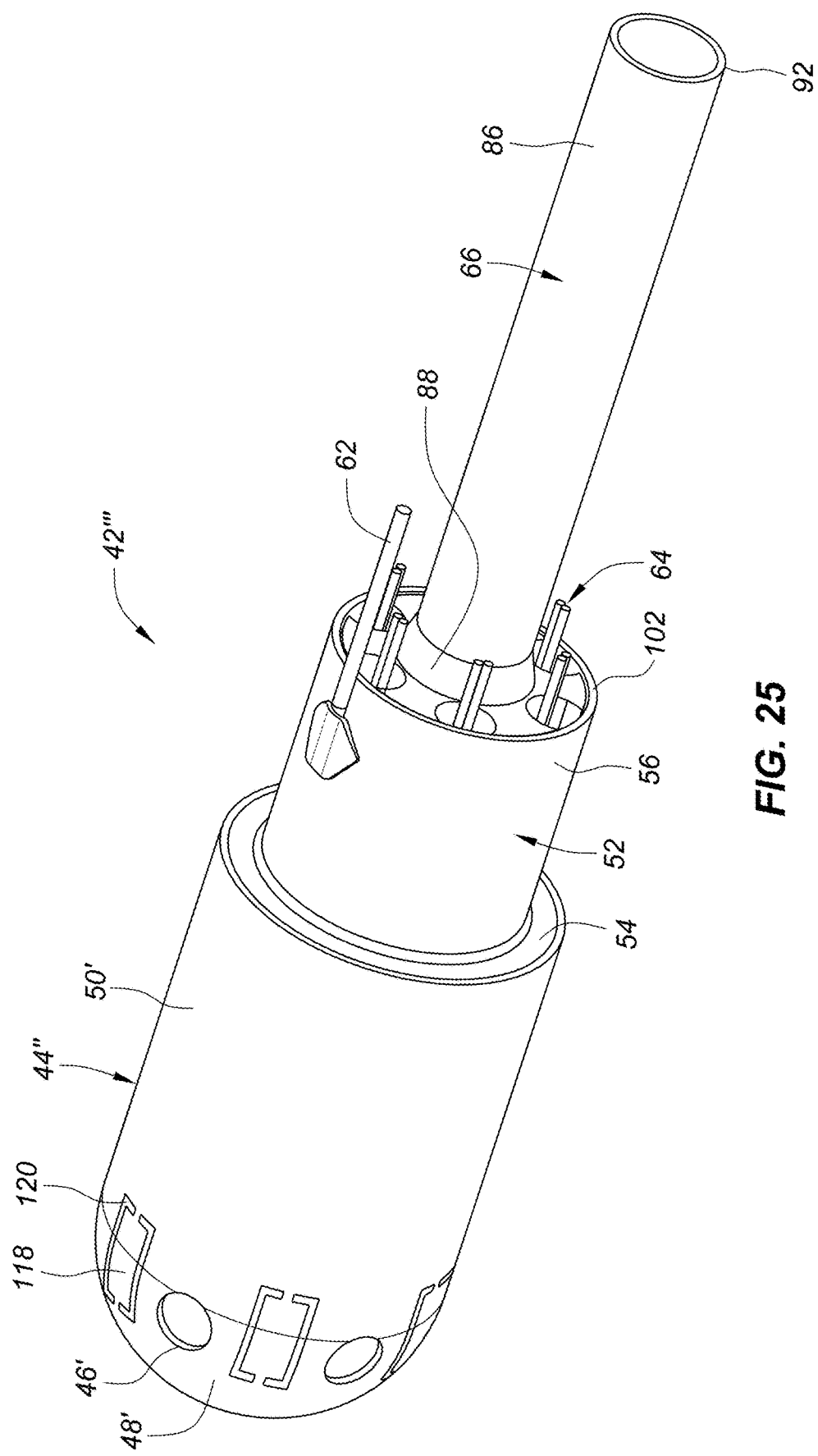
FIG. 25 is most similar to FIG. 8, but depicts an alternative embodiment comprising one or more isolated temperature-sensing islands.

FIG. 25 is most similar to FIG. 8, but depicts one form of an alternative embodiment of a catheter tip 42''' comprising one or more isolated temperature-sensing islands 118 which, in this embodiment, reside partially on the domed distal end 48' of the conductive shell 44'' and partially on the cylindrical body 50' of the conductive shell 44''. Each of these temperature-sensing islands 118 is outlined or circumscribed by a strip of insulative material 120 placed to reduce or eliminate any potential influence from irrigant flowing through the nearby holes 46' in the conductive shell. In particular, if the cooled irrigant flowing through a hole through the conductive shell meaningfully reduces the temperature of the conductive shell around the hole, that lower temperature would not be transmitted to a temperature sensor mounted within the conductive shell below the temperature-sensing island 118.

Although a single-layer conductive shell 44 (see, e.g., FIGS. 10-13 and 15) constructed from a thin layer of gold, for example, may perform in an magnetic resonance (MR) environment without causing undesirable or unmanageable MR artifacts, a conductive shell comprising an outer layer of a paramagnetic material such as platinum or platinum iridium, for example, may benefit from a multilayer construction as discussed below.

Figure 26:
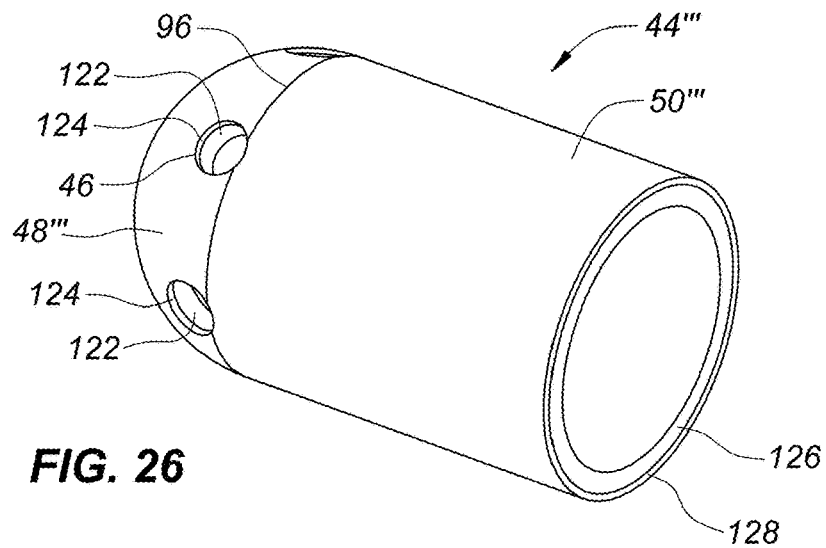
FIG. 26 is most similar to FIG. 12, but depicts a multilayer embodiment of the conductive shell.

FIG. 26 is most similar to FIG. 12, but depicts a multilayer conductive shell 44'''. A multilayer conductive shell may have just a multilayer cylindrical body portion, just a multilayer domed distal end portion, or both a multilayer domed distal end portion and a multilayer cylindrical body. In the embodiment depicted in FIG. 26, both the domed distal end portion 48''' and the cylindrical body 50''' have a multilayer construction. As shown in this figure, the domed distal end portion 48''' comprises an inner layer 122 and an outer layer 124, and the cylindrical body 50''' similarly comprises an inner layer 126 and an outer layer 128. Again, however, it is not a requirement that the domed distal end portion and the cylindrical body must both be constructed with the same number of layers or with the same thickness of layers. Also, the walls of the conductive shell 44''' may, for example, be of a total thickness that is the same as, or nearly the same as, the thickness 98 (see FIG. 12) of the single-layer conductive shell 44 described above. The conductive shell could be formed or manufactured per, for example, the techniques already described herein.

Figure 27A:
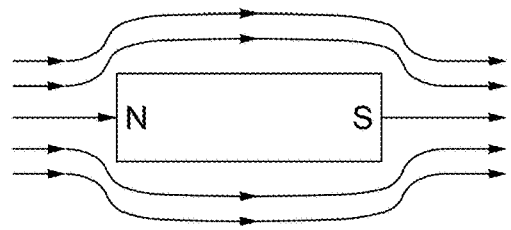
FIG. 27A schematically depicts magnetic flux lines reacting to a diamagnetic substance.
Figure 27B:
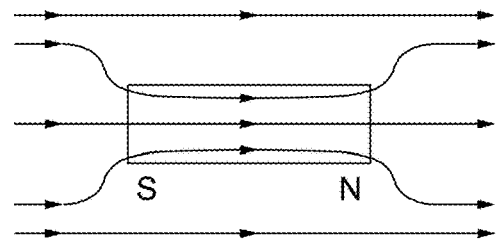
FIG. 27B schematically depicts magnetic flux lines reacting to a paramagnetic substance.
Figure 27C:
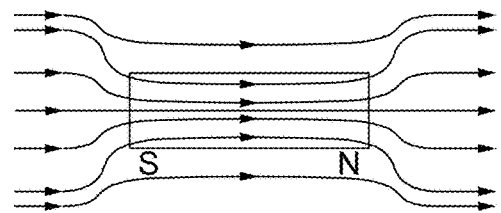
FIG. 27C schematically depicts magnetic flux lines reacting to a ferromagnetic substance.

FIGS. 27A, 27B, and 27C schematically depict various materials or substances in a magnetic field (e.g., in an MR environment). In particular, FIG. 27A schematically depicts magnetic flux lines reacting to a diamagnetic substance (the lines of force tend to avoid the substance when placed in a magnetic field), FIG. 27B schematically depicts magnetic flux lines reacting to a paramagnetic substance (the lines of force prefer to pass through the substance rather than air), and FIG. 27C schematically depicts magnetic flux lines reacting to a ferromagnetic substance (the lines of force tend to crowd into the substance). Platinum iridium (a paramagnetic material) is commonly used for constructing catheter tips. Thus, as may be discerned from looking at FIG. 27B, a thin conductive shell (e.g., conductive shell 44 depicted in FIG. 12) constructed entirely from platinum or platinum iridium (or some other paramagnetic material) may induce MR artifacts.

As mentioned above, a more MR compatible catheter tip may comprise, for example, a single layer conductive shell 44 constructed entirely from a diamagnetic material (e.g., a thin gold conductive shell) or a multilayer conductive shell 44'''. In one example of an MR compatible multilayer conductive shell, the conductive shell 44''' comprises a shell distal end portion (shown as domed distal end 48''' in FIG. 26) and a shell proximal end portion (shown as cylindrical body 50'''in FIG. 26). In this embodiment, the conductive shell 44''' may comprise a platinum iridium outer layer (or skin) 124, 128 and an inner layer (or liner or core) 122, 126 constructed from a diamagnetic material (e.g., gold or copper). In such an embodiment, the paramagnetic outer layer 124, 128 and the diamagnetic inner layer 122, 126 'cooperate' in a manner that minimizes or mitigates against the generation of undesirable MR artifacts. In some multilayer embodiments (e.g., with a paramagnetic outer layer and a diamagnetic inner layer), it can be beneficial to mass balance or volume balance the material comprising the layers of the multilayer conductive shell 44'''. Alternatively, the multilayer conductive shell 44''' of the MR compatible catheter tip may have an outer layer constructed from a diamagnetic material (such as bismuth or gold) and an inner layer constructed from a paramagnetic material (such as platinum or platinum iridium).

In yet another embodiment (not shown), a multilayer conductive shell may comprise more than two layers. For example, the conductive shell may comprise three layers, including a very thin outer layer of a paramagnetic material, a somewhat thicker or much thicker intermediate layer of a diamagnetic material, and an oversized internal layer of a non-precious metal (or plastic or other material) sized to ensure that the finished geometry of the overall ablation tip is of a desired size for effective tissue ablation.

Materials that could be used for the inner layer or liner include, but are not limited to, the following: silicon (metalloid); germanium (metalloid); bismuth (post transition metal); silver; and gold. Silver and gold are examples of elemental diamagnetic materials that have one-tenth the magnetic permeability of paramagnetic materials like platinum. Thus, one example multilayer shell configuration could comprise a platinum outer layer (or skin) and an inner layer (or liner or core) of gold or silver with a thickness ratio (e.g., platinum-to-gold thickness ratio) of at least 1/10 (i.e., the platinum layer being one-tenth as thick as the gold layer). In another example, a multilayer conductive shell configuration 44''' could comprise a platinum outer layer and a bismuth inner layer with a thickness ratio (e.g., platinum-to-bismuth thickness ratio) of at least 1/2 (i.e., the platinum outer layer being one-half as think as the bismuth inner layer) since bismuth has a permeability that is about one-half the permeability of platinum. The layers may also be constructed from alloys, which may be used, for example, when a pure element material might otherwise be disqualified from use in the construction of a catheter tip.

FIG. 28A is most similar to FIG. 20, but depicts an embodiment having both distal temperature or thermal sensors 68 and proximal temperature or thermal sensors 68' mounted on a tip insert. As depicted in FIG. 28A, a plurality of temperature sensors 68' may be deployed around or near the proximal end of the tip 42. These temperature sensors 68' could be mounted, for example, on the ablation tip insert as already described above. Although FIG. 28A depicts an ablation tip insert 58 for an irrigated tip 42, the proximal temperature sensors 68' may also be used in non-irrigated embodiments such as the tip 42' depicted in FIG. 9. The proximal thermal sensors 68' may be deployed, for example, in an angularly-spaced configuration similar to the configuration of the six radially-disposed distal temperature sensors 68 shown in, for example, FIGS. 15, 19, 20, and 21 (but located near the proximal end of the main body 72 of the ablation tip insert 58 rather than its distal end). The temperature sensor configuration depicted in FIG. 28A would provide a higher-resolution 'picture' of the thermal profile of the tip and, therefore, a better understanding of tissue temperature near the catheter tip during ablation. This is particularly beneficial when such a tip construction is used with the pulsed RF control systems disclosed herein.

As shown in FIG. 28A, a catheter tip consistent with the present disclosure may have one or more irrigant channels distributed along a length and around a circumference of the catheter tip. Various design factors including quantity, location, size, and nozzling effect (if any) of the irrigant channels may depend upon specific applications. In the present embodiment, six distal irrigation channels 70 are circumferentially distributed about a distal end of the ablation tip insert 58, with both distal thermocouples 68 and proximal thermocouples 68' located proximal thereof. Similarly, six proximal irrigation channels 70' are circumferentially distributed on a main body 72 of the ablation tip insert 58 near the intersection of the main body and stem 74. The proximal irrigation channels 70' are proximal of both distal thermocouples 68 and proximal thermocouples 68'.

FIG. 28B is an isometric view of a conductive shell 44 for assembly over the tip insert 58 of FIG. 28A, consistent with various aspects of the present disclosure. As shown in these figures, the conductive shell may comprise a hemispherical or nearly-hemispherical domed distal end 48 and a cylindrical body 50. In the figures, a 'seam' 96 is shown between the domed distal end 48 and the cylindrical body 50. This may be merely a circumferential transition line between the cylindrical body and the domed distal end of a unitary component; or, alternatively, it may be the location where the cylindrical body is connected to the domed distal end by, for example, welding. In one embodiment, the wall thickness 98 of the shell is 0.002 inches, but alternative wall thicknesses are also readily envisioned. For example, some experimental embodiments have a wall thickness 98 of the conductive shell 44 that is between 0.006-0.008 inches. The conductive shell 44 may be formed or manufactured by, for example, forging, machining, drawing, spinning, or coining. In this particular embodiment, the shell 44 includes 12 irrigation holes 46 and 46', six of which are visible in this isometric view. The irrigation holes form two circumferentially extending rings about the conductive shell. A first proximal circumferential ring including irrigation holes 46', and a second distal circumferential ring including irrigation holes 46. The 12 irrigation holes 46 and 46' align with the 12 irrigation channels 70 and 70' on the tip insert 58 (as shown in FIG. 28A). Although the conductive shell 44 depicted in the figures includes 12 irrigation holes 46 and 46', more or fewer holes may be used, and the size of the holes may be larger, or smaller, or a mix of larger and smaller holes.

Various embodiments of HTS ablation catheters and systems are disclosed herein as are embodiments of control algorithms for the HTS ablation catheters and HTS ablation catheter systems. User interfaces of control system software for the HTS ablation catheter systems are also disclosed, such as user interfaces for integration with existing hardware and software systems such as EnSite™ cardiac mapping systems manufactured by St. Jude Medical, Inc., Ampere™ RF ablation generators also manufactured by St. Jude Medical, Inc., among others. Theses user interfaces may include, for example, visual means of communicating data to a physician about a distal tip of the HTS catheter. In specific embodiments, the HTS ablation catheter, in conjunction with a control system, may convey temperature distribution across the catheter tip, orientation of the catheter tip relative to tissue in contact therewith, tip-tissue surface contact area (via temperature information, or a combination of catheter tip temperature information and impedance information), an estimate of energy delivered to tissue in contact with the catheter tip during ablation therapy, an estimate of a lesion size resulting from the ablation therapy, blood flow rates adjacent to the catheter tip, thermal stability of the tip/lesion, among other relevant aspects of an ablation therapy procedure.

Various embodiments are directed to ablation catheter systems including one or more thermal sensors (e.g., thermocouples, etc.) distributed within, and in thermal communication with, an ablation catheter tip. The resulting array of thermal sensors facilitates various aspects of the present disclosure—for example, due to the fast temperature response of the HTS catheter, an accurate temperature distribution of the tip can be obtained and conveyed to a physician (e.g., via EnSite™ software). Specific algorithms consistent with the present disclosure may also be utilized to facilitate the communication of physician relevant information, which may result in improved lesion prediction and patient safety. Moreover, the temperature data received from the array of thermal sensors may be used to control a tissue ablation process. For example, controller circuitry may receive the temperature data from the array of thermocouples and control an ablation energy applied to tissue in contact with the ablation tip based on one or more of the thermocouples. As discussed above, at least one embodiment, the ablation control system controls the ablation process by relying upon only the highest sensed temperature of the thermocouple array as a control input.

FIG. 29A is a visualization of a catheter tip 42 of an ablation catheter 12 including a plurality of thermocouple nodes distributed about the catheter tip, consistent with various aspects of the present disclosure. The thermocouple nodes providing visual representations of the temperatures sensed by the plurality of thermocouples on a distal tip of the ablation catheter. In the present embodiment, the plurality of thermocouples include a distal-most thermocouple node 114, a distal circumferentially-extending set of thermocouple nodes $68_{1-6}$, and a proximal circumferentially-extending set of thermocouple nodes $68'_{1-6}$. The configuration of the thermocouple nodes in the visualization of the catheter tip is generally indicative of an actual position of thermocouples within a catheter tip. Each thermocouple node facilitates visualization of a sensed temperature at the paired thermocouple on the distal catheter tip 42. The illustration of FIG. 29A is an example of how temperature information may be presented to a clinician during an ablation therapy. In such an embodiment, the various thermocouple nodes may change color (or gray-scaling) based on a sensed temperature at the associated thermocouple, as represented by the thermocouple node. In alternative embodiments, the temperature variations may be shown by distinct temperature regions with related digital temperature read-outs displayed on or near each region. In yet further embodiments, temperature gradients between each thermocouple node may be estimated and added between each thermocouple node to represent temperatures between the known node temperatures. Also, further visualizations, based on the received thermocouple outputs, may depict an estimated contact area and location between the catheter tip and tissue on the displayed catheter tip. This perceived contact may be integrated with localization data to further bolster the confidence level of, or correct inaccuracies in, the estimated location and orientation of the ablation catheter tip relative to, for example, cardiac tissue.

The number of thermocouples comprising part of a catheter tip 42 and the location, placement, or distribution of those thermocouples may be selected for a particular therapeutic or diagnostic procedure. A visualization of ablation catheter 12, including thermocouple nodes (114, $68_{1-6}$, and $68'_{1-4}$) may directly correlate with the actual relative positive of the various thermocouples in the catheter tip, or may be a simplified representation of the thermocouple array configuration. For example, where the temperature data of two or more thermocouples are visualized by a single thermocouple node by averaging, selecting only one—the high or low value, or moving the thermocouples nodes in the visualization to facilitate visibility. In further more specific embodiments, an ablation control system may receive thermocouple data, process the data, and only display to the clinician relevant temperature data. For example, the ablation control system may not display temperature data indicative of a side of the catheter tip in thermal communication with a blood pool. By removing such potentially irrelevant data, the visualization may be easier for a clinician to interpret. In yet other embodiments, such temperature data related to a blood pool side of the ablation catheter tip 42 may be used to calculate a flow rate of the blood pool or blood pressure, and be displayed in the visualization of catheter tip 42. The temperature data may also be utilized to sense the temperature of a blood pool in thermal contact with the thermocouples—which may be used to prevent blood charring or desiccation on the ablation catheter tip 42.

To further simplify the visualization of ablation catheter 12, based on a known location of each thermocouple and the related data channel upon which thermocouple data associated with each of the thermocouples is received, temperature gradients may be applied to a surface area of the ablation catheter 12 at both known locations of the thermocouples, as well as artificially added between each thermocouple node to represent estimated temperatures between known node temperatures. Such approximation may utilize linear approximations, or more complex non-linear solutions (e.g., where an initial temperature distribution is non-uniform).

FIG. 29B is a visualization of ablation catheter 12 including a plurality of thermocouple nodes distributed about a catheter tip 42, where each thermocouple node is depicted with various cross-hatching to depict a sensed temperature indicative of a particular temperature environment in thermal communication with the thermocouple nodes (e.g., 114, $68_{1-6}$, and $68'_{1-6}$,), consistent with various aspects of the present disclosure. Other sensed temperature indications are readily envisioned including gray scale, and variable coloring.

As indicated by the crosshatching on each of the thermocouple nodes, thermocouple nodes $68_{4-6}$ are receiving the most thermal energy (e.g., a surface area of the ablation catheter tip in thermal communication with the thermocouple nodes $68_{4-6}$ are the warmest—above 100 degree Celsius). In various embodiments, an ablation control system (e.g., Ampere™) receives the temperature data (via communication channels) from the plurality of thermocouples, and ignores all the communication channels except for the warmest readings. The control system regularly sampling all of the communication channels to verify/change which of the communication channels functions as the control input. During the ablation therapy, the ablation control system may adjust energy delivered to tissue in contact with the ablation catheter tip 42 based on fluctuation (if any) of the control input.

The visualization of ablation catheter 12 including ablation catheter tip 42 may further provide visual cues to the clinician as to the tip-tissue coupling area based on the displayed temperatures of the plurality of thermocouples. As shown in FIG. 29B, the clinician may approximate that 80% of the domed distal tip of the ablation catheter is coupled with tissue (e.g., by noting that thermocouple nodes 114, $68_{3-6}$, and $68'_{1,\ 4-6}$ exceed 60 degrees Celsius). Similarly, tip-blood coupling may also be determined based on the displayed temperatures of the plurality of thermocouples. Specifically, given that the temperatures of thermocouple nodes $68_{1-2}$ and $68'_{2-3}$ are at or below 60 degrees Celsius, it may be presumed that these thermocouples and the external area of the ablation catheter tip in proximity thereto are being cooled by a blood flow of the blood pool.

In more specific embodiments, an ablation control system may further include an algorithm that estimates the tip-tissue coupling area based at least in part on a minimum temperature threshold (e.g., 60 degrees Celsius).

Figure 29C:
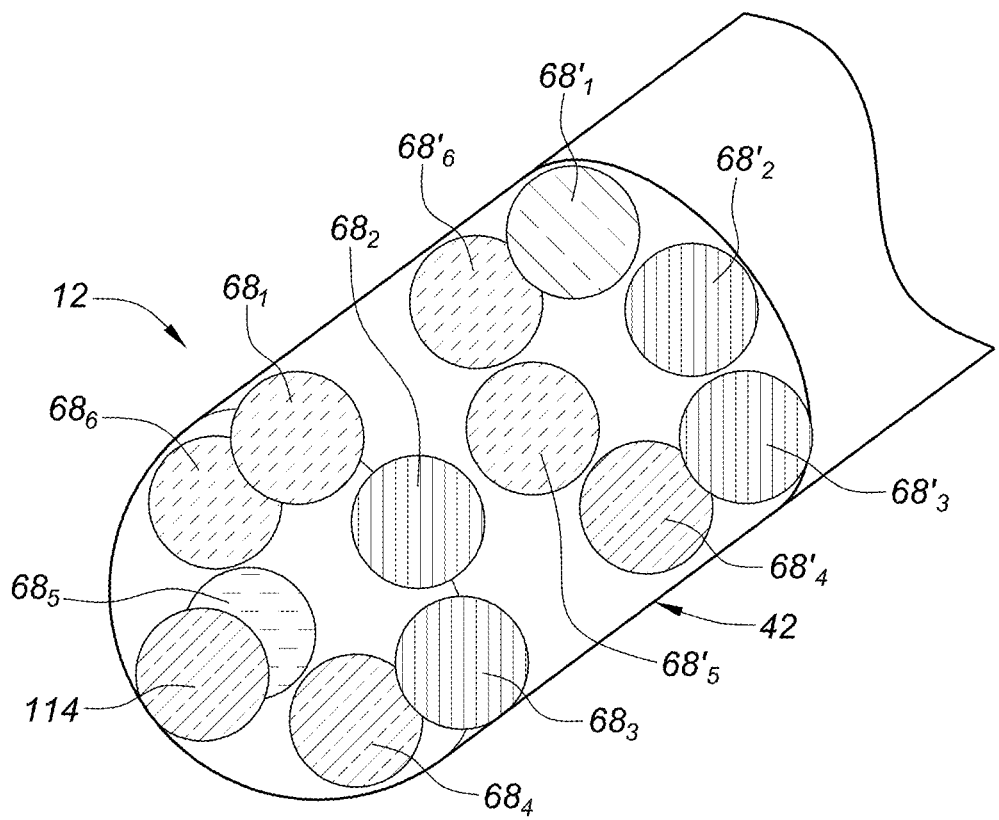
FIG. 29C is an isometric view of a catheter tip including a plurality of thermocouple nodes distributed about the catheter tip, where each thermocouple node is shaded in gray scale to depict a sensed temperature indicative of another particular environment, consistent with various aspects of the present disclosure.

FIG. 29C is a visualization of ablation catheter 12 including a plurality of thermocouple nodes distributed about catheter tip 42, where each thermocouple node is cross-hatched to depict a sensed temperature, consistent with various aspects of the present disclosure. Various embodiments are directed to methods for estimating tip-tissue coupling prior to completing an ablation therapy. In such embodiments, an ablative element at the distal tip 42 of the catheter is driven at a low power (e.g., 0.25-3 Watts, and more specifically 0.5 Watts in some embodiments) with a temperature control of 40 degrees Celsius to determine an amount of tip-tissue coupling. As shown in FIG. 29C, the tip-tissue coupling may be visually estimated by a clinician based on a several degree Celsius increase in thermocouples thermally coupled to tissue. Specifically, in the present embodiment, thermocouple nodes 114, 681, 4-6, and 68'4-6 indicate a temperature increase of about 3-4 degrees Celsius compared to thermocouple nodes 682-3 and 68'1-3 which are being cooled by blood flow (and therefore not in contact with tissue). Accordingly, a clinician may visually determine or an algorithm may numerically calculate that about 60-70% of the tip is coupled to tissue.

Visualization of ablation catheter 12, including temperature distribution across the tip, may also facilitate determination of catheter orientation relative to the tissue in contact therewith. Moreover, when combined with catheter localization systems including 6 degrees-of-freedom magnetic sensors, for example, the temperature distribution may be represented displayed on existing localization system displays (e.g., Ensite™, a St. Jude Medical, Inc. product).

In further more specific embodiments, aspects of the present disclosure include tip-tissue contact estimations may be integrated with impedance-based localization systems to further improve tip-tissue contact estimations.

The visualizations of FIGS. 29A-C may be presented to a clinician on a graphical display, for example.

Aspects of the present disclosure are also directed toward calculating blood flow around a tip 42 of an ablation catheter utilizing one or more of a plurality of thermocouples distributed about the catheter tip. In one example embodiment, a short burst of power (e.g., 1-5 seconds at 10-30 Watts) may be applied when the tip is in position to create tissue heating without creating a lesion. The rate of temperature rise may be used to estimate not only tip-tissue coupling (e.g., by observing the number of thermocouples that see a temperature rise above a threshold), but also tissue responsiveness to radio frequency energy and blood flow rate (e.g., blood flow rate at the lesion site is correlated with a rate of temperature fall after the power to the ablation catheter tip has been terminated). The following graph in FIG. 30 expounds on such an embodiment.

While various embodiments of the present disclosure are directed to an ablative element powered by a power control generator, various embodiments may implement a current control generator.

Figure 30:
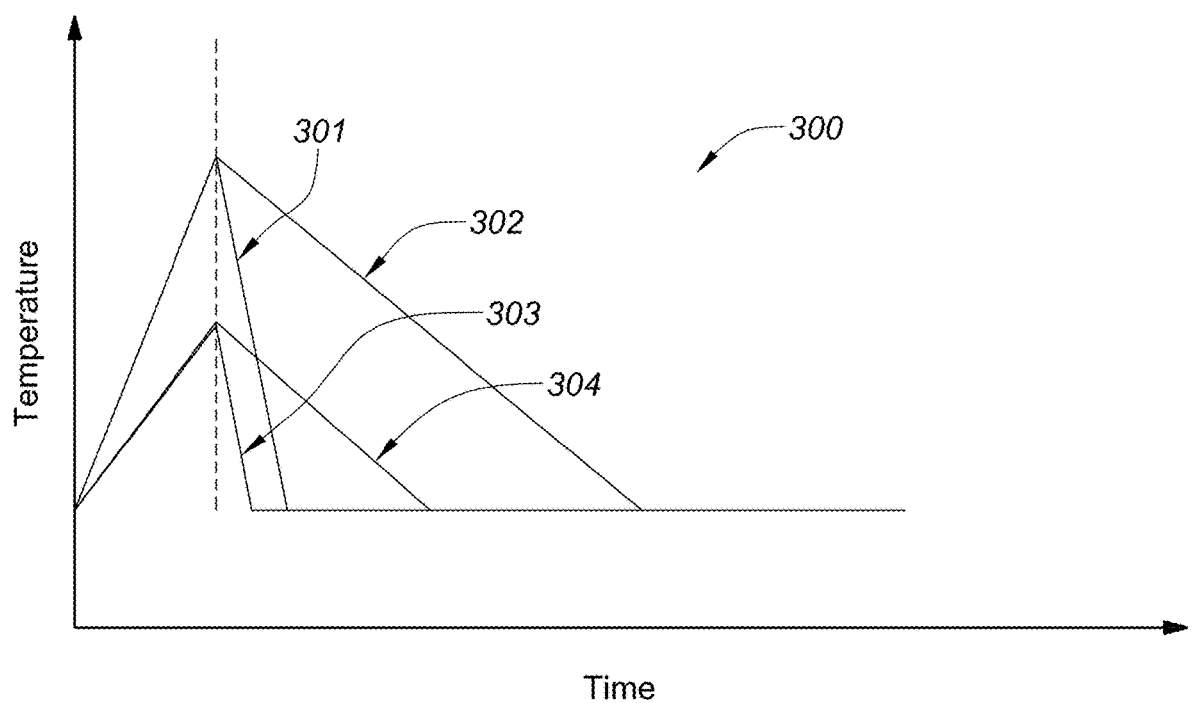
FIG. 30 depicts a graph of temperature over time for various tissue coupling and blood flow scenarios of an ablation therapy, consistent with various aspects of the present disclosure.

FIG. 30 depicts a graph of temperature over time for various tissue coupling and blood flow scenarios of an ablation therapy. Line 301 shows a high-rate of initial temperature rise during an ablation therapy (e.g., ablative energy burst), followed by a high rate of temperature fall thereafter—indicative of a tissue coupling scenario including good tip tissue coupling and a high blood flow rate. Line 302 shows a high-rate of temperature rise during the ablative energy burst, followed by a low rate of temperature fall thereafter—indicative of good tissue coupling and low blood flow rate. Line 303 displays a low rate of temperature rise in response to the ablative energy burst, followed by a high-rate of temperature fall after the ablative energy burst—indicating poor tip-tissue coupling and high blood-flow rate. Line 304 displays a low rate of temperature rise during the ablative energy burst, and a low-rate of temperature fall thereafter—such characteristics being indicative of both poor tip-tissue coupling and low-blood flow. By tracking the temperature data over time for one or more thermocouples on the ablation catheter tip, characteristics of the ablation therapy may be analyzed immediately following each therapy application to estimate an efficacy thereof. In further more specific embodiments, an algorithm may be utilized to analyze such information including the rise rate and fall rate of the thermocouples and determine relevant ablation characteristics.

Various embodiments are also directed to an ablation catheter system including a controller to maintain lesion temperature stability during an ablation therapy. For example, by monitoring real-time variation of thermocouple data outputs, when a sensed temperature exceeds a maximum variation threshold the controller may compensate and adjust power delivered to the ablation catheter tip. Further, the controller system may be configured to indicate to a clinician a confidence interval for the estimated lesion size based at least in part on sensed data (e.g., thermocouple readings) indicative of the efficacy of the ablation therapy.

Tissue temperature at an ablation therapy location is a highly important predictor of lesion size and safety profile for the therapy (e.g., tissue steam pops and char/coagulation of the blood pool). Accordingly, implementing a feedback loop in an ablation therapy control system may improve efficacy and safety of such ablation therapies. FIGS. 31A-D exemplifies the improved lesion size prediction ability of temperature data during an ablation therapy when combined with force data.

FIGS. 31A-D depict various ablation catheter tip to tissue coupling scenarios, consistent with various aspects of the present disclosure. The present application is exemplifying a low-power, low-temperature coupling assessment, but aspects of the present embodiment may be readily transferred to higher power, and higher temperature lesion formation. In each of FIGS. 31A-C, a force reading would be approximately 20 grams; however, the catheter tip temperature and complex impedance information between the catheter tip and tissue varies in each situation. Relying on force data alone, a clinician would likely expect the lesions sizes to be the same for each of FIGS. 31A-C. However, given the varying tip-tissue coupling (and equivalent time, temperature, and power settings), the resulting lesion sizes of each of the tissue coupling scenarios will vary.

Figure 31A:
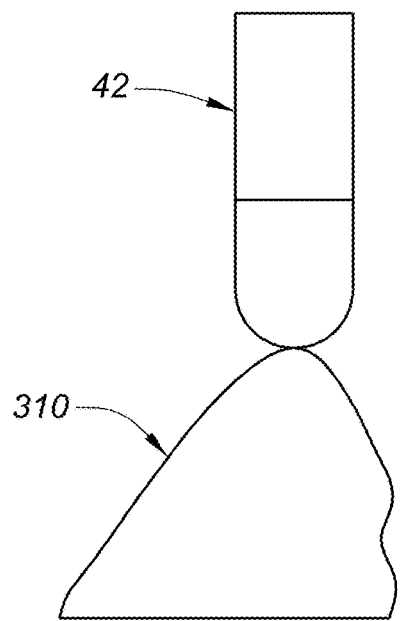
FIGS. 31A-D depict various ablation catheter tip to tissue coupling scenarios, consistent with various aspects of the present disclosure.

FIG. 31A shows an ablation catheter tip 42 in contact with tissue 310. The tip-tissue contact area is minimal as only a small portion of the distal tip 42 of the catheter is in contact with the tissue 310. In the present tissue coupling scenario, only a single, distal-most, thermocouple returns a signal indicative of a temperature above 40 degrees Celsius as the thermocouples proximal the distal-most thermocouple would not be in contact with the tissue but instead would be cooled by the flow of the blood pool. While the force sensor within the catheter tip may experience approximately 20 grams of force (similar to all of FIGS. 31A-C), the electrical coupling index (produced by the impedance-based localization system) is only 2, which indicates in conjunction with the temperature readings an undesirable tissue coupling scenario which will likely produce a small ablation lesion.

Figure 31B:
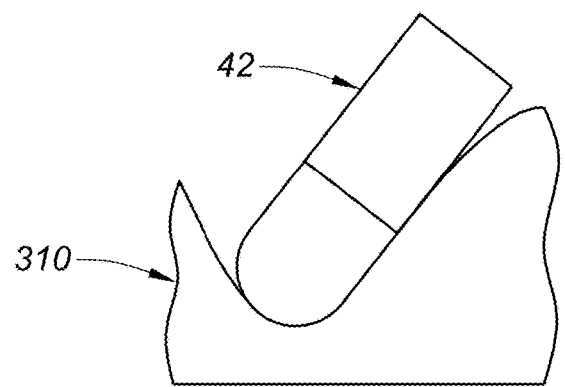

FIG. 31B shows an ablation catheter tip 42 in contact with tissue 310. The tip-tissue contact area is large as one side of the length of the catheter tip is in contact with a valley of tissue 310. As a result, six thermocouples will return a signal indicative of a temperature above 40 degrees Celsius including a thermocouple on the distal tip and a number of the thermocouples that form circumferentially-extending rings at proximal and distal locations within the catheter tip. The resulting electrical coupling index is 9, in conjunction with the thermocouple temperature readings indicate very good tissue coupling which will produce a large ablation lesion.

Figure 31C:
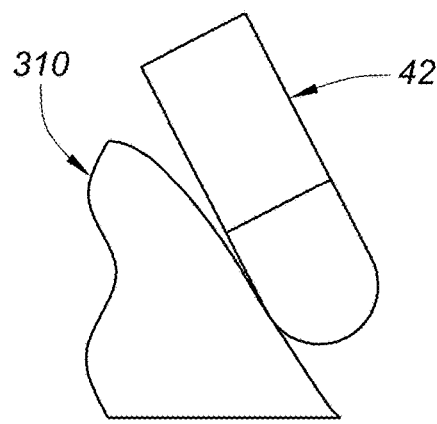

FIG. 31C shows an ablation catheter tip 42 in contact with tissue 310, similar to FIG. 31B, but the distal most tip is not in contact with a valley of the tissue 310. The tip-tissue contact area is moderate as one side of the length of the catheter tip is in contact with a valley of tissue 310. As a result, three thermocouples will return a signal indicative of a temperature above 40 degrees Celsius including a number of the thermocouples that form the circumferentially-extending rings at proximal and distal locations within the catheter tip. The resulting electrical coupling index is 6, which in conjunction with the temperature sensor readings, indicate moderate tissue coupling which will produce a mediocre ablation lesion.

Figure 31D:
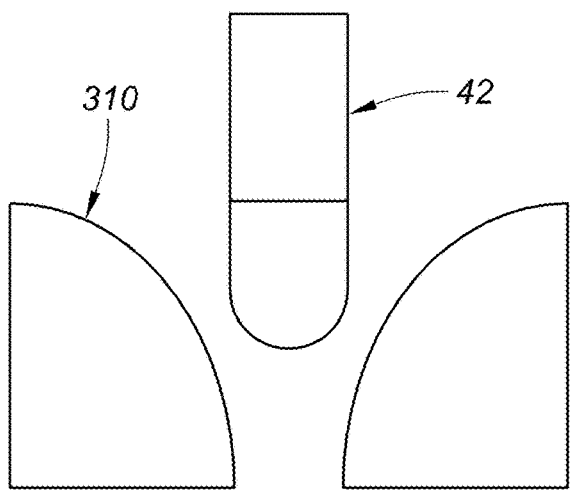

FIG. 31D is intended to illustrate how thermocouple data may complement complex impedance information. As shown in FIG. 31D, catheter tip 42 is centered in, for example, a pulmonary vein artery where it exits the left atrium. Complex impedance may predict that the catheter tip 42 is in contact with tissue 310, but the tip is not in contact with tissue, but merely in proximity thereto. Specifically, in the present scenario, the electrical coupling index is 9. Temperature readings from the thermocouples on the catheter tip would help to clarify that the tip is not in contact with tissue 310, in this scenario, as none of the thermocouples are reading above 40 degrees Celsius.

Figure 32:
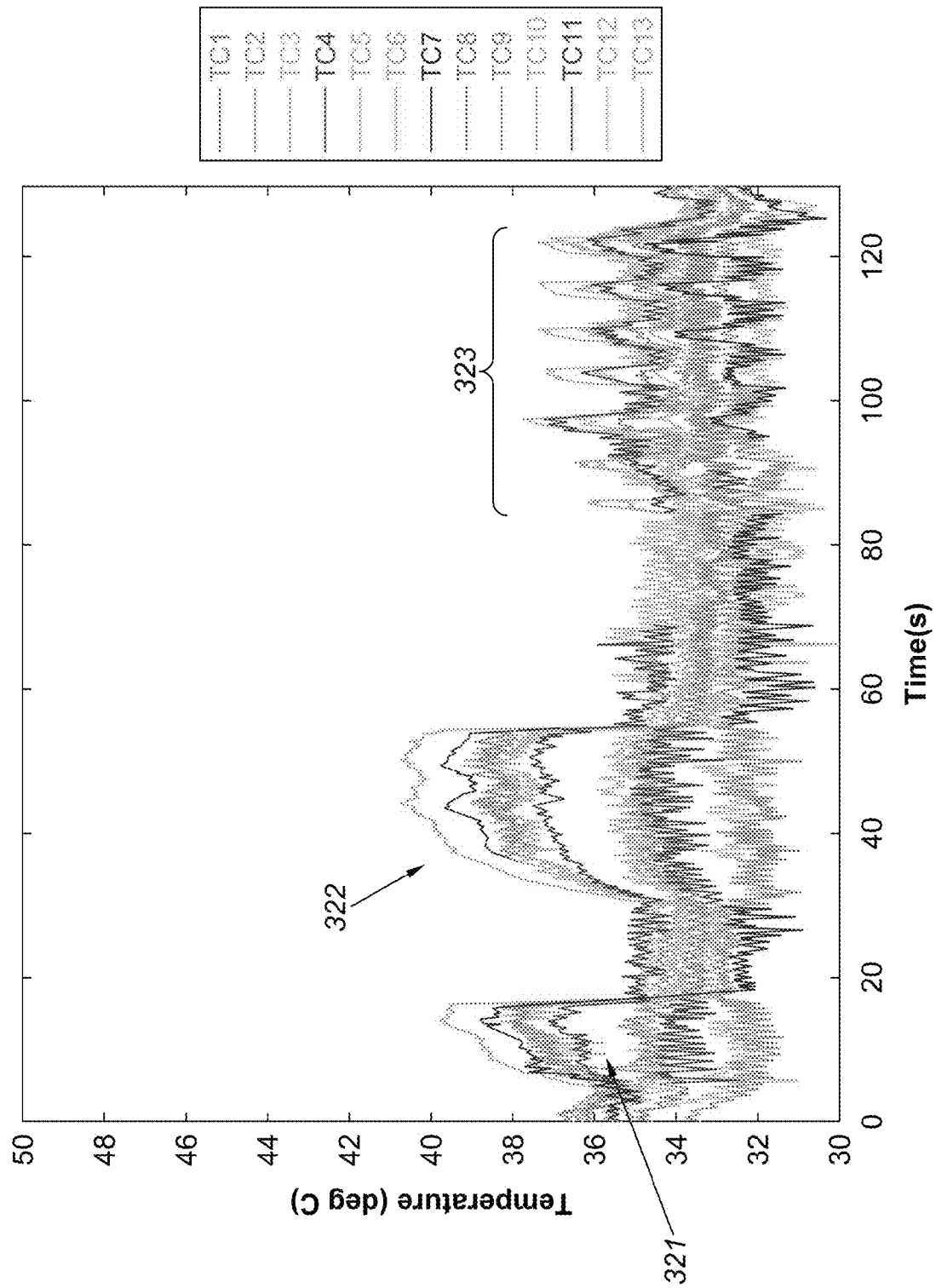
FIG. 32 is a graph of temperature data over time from a plurality of thermocouples distributed about a catheter tip during an ablation therapy, consistent with various aspects of the present disclosure.

FIG. 32 is a graph of temperature data over time from a plurality of thermocouples distributed about a catheter tip during an ablation therapy, consistent with various aspects of the present disclosure. In the present embodiment, ablation therapy of myocardial tissue within a cardiac muscle is being conducted via RF energy (emitted from the catheter tip). The RF energy is emitted at a power of approximately 2 watts, and an irrigant flow rate of approximately 6 milliliters per minute. A spike 321 of a number of thermocouple signals (at approximately 5-20 seconds) is indicative of contact between tissue and a portion of the catheter tip. That is, the flow of the RF signal from the catheter tip to the myocardial tissue causes warming of the tissue in contact with the catheter tip, and thermal heat transfer back to the portions of the catheter tip in contact with the tissue. The respective thermocouples positioned within or in close proximity to the contacted tissue sense the temperature increase 321. However, as not all of the thermocouples are positioned in close proximity to the contacted tissue, many of the thermocouples maintain a temperature signal close to body temperature.

A second, prolonged, temperature spike 322 of approximately 25 seconds indicates tissue contact for that period. As the same thermocouples output increased temperature signals during the second spike 322, as observed in the first spike 321, it would appear that the relative orientation of the catheter tip to the tissue has been maintained. Momentary thermocouple signal bursts 323, between 80-120 seconds, are indicative of unsustained tissue contact.

Based on the known, relative locations of each of the thermocouples relative to one another, controller circuitry may determine the location of tissue contact with the catheter tip and display the contact to a clinician (see, e.g., FIGS. 31A-D). Moreover, based on the thermocouple signals received by the controller circuitry, a tissue contact area estimate may be calculated and used to determine power density delivered to the tissue. Based on the estimated power density delivered to the tissue over the contact period, likelihood of tissue necrosis may be assessed.

Figure 33:
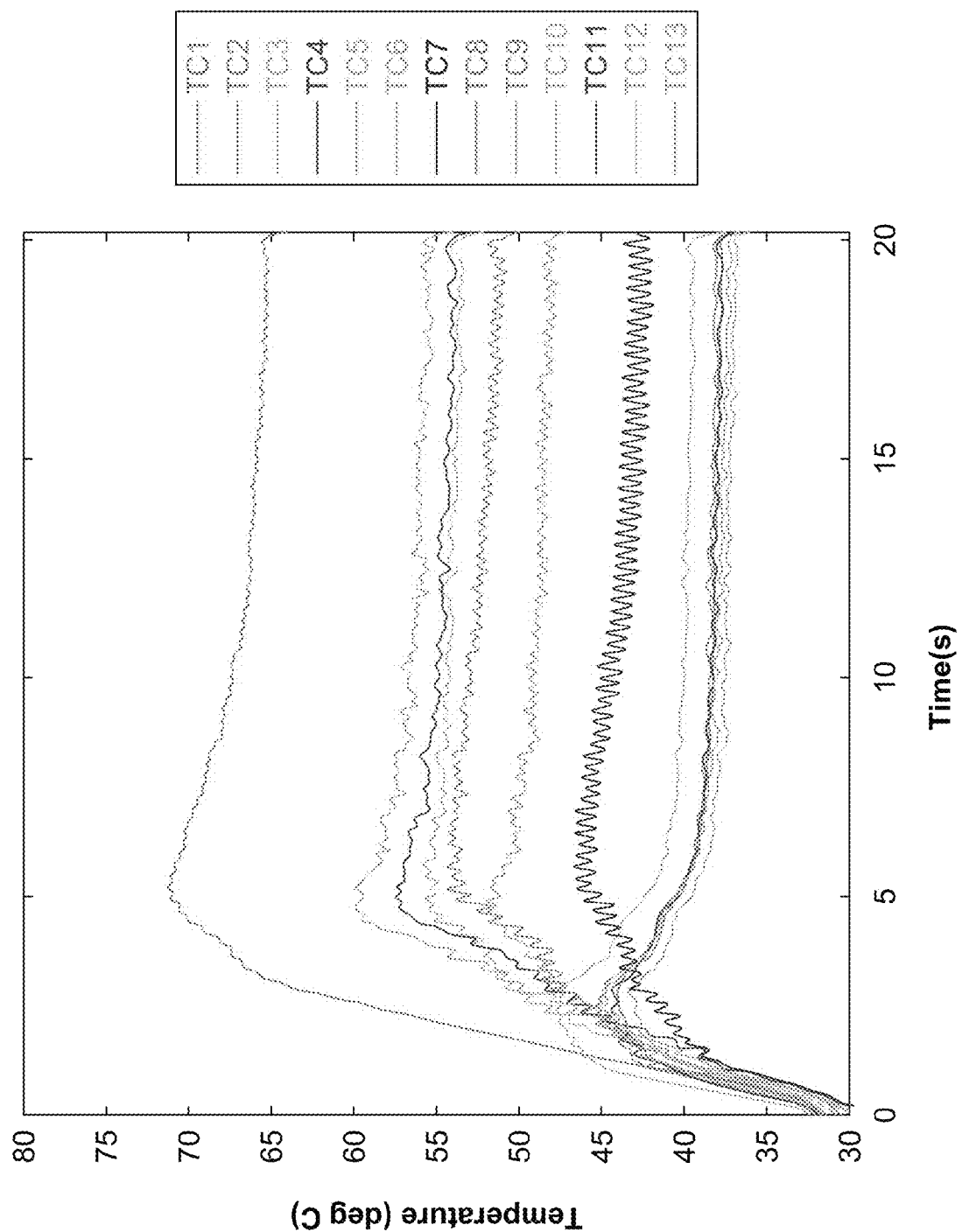
FIG. 33 is a graph of temperature data over time from a plurality of thermocouples distributed about a catheter tip during an ablation therapy, consistent with various aspects of the present disclosure.

FIG. 33 is a graph of temperature data over time from a plurality of thermocouples distributed about a catheter tip during an ablation therapy, consistent with various aspects of the present disclosure. Controller circuitry receiving the temperature data of FIG. 33 may determine the orientation of the catheter tip relative to the tissue based on the known locations of each of the thermocouples. In the present embodiment, the catheter tip is in contact with the tissue at essentially a right angle (see, e.g., FIG. 31A). The controller circuitry may analyze the thermocouple signals to determine this relative orientation. As shown in FIG. 33, the signal from TC1 (which is located at a distal tip of the catheter) indicates the largest temperature spike. With the remaining thermocouple signals indicating decreasing temperatures the further from the distal tip the thermocouples are.

Figure 34:
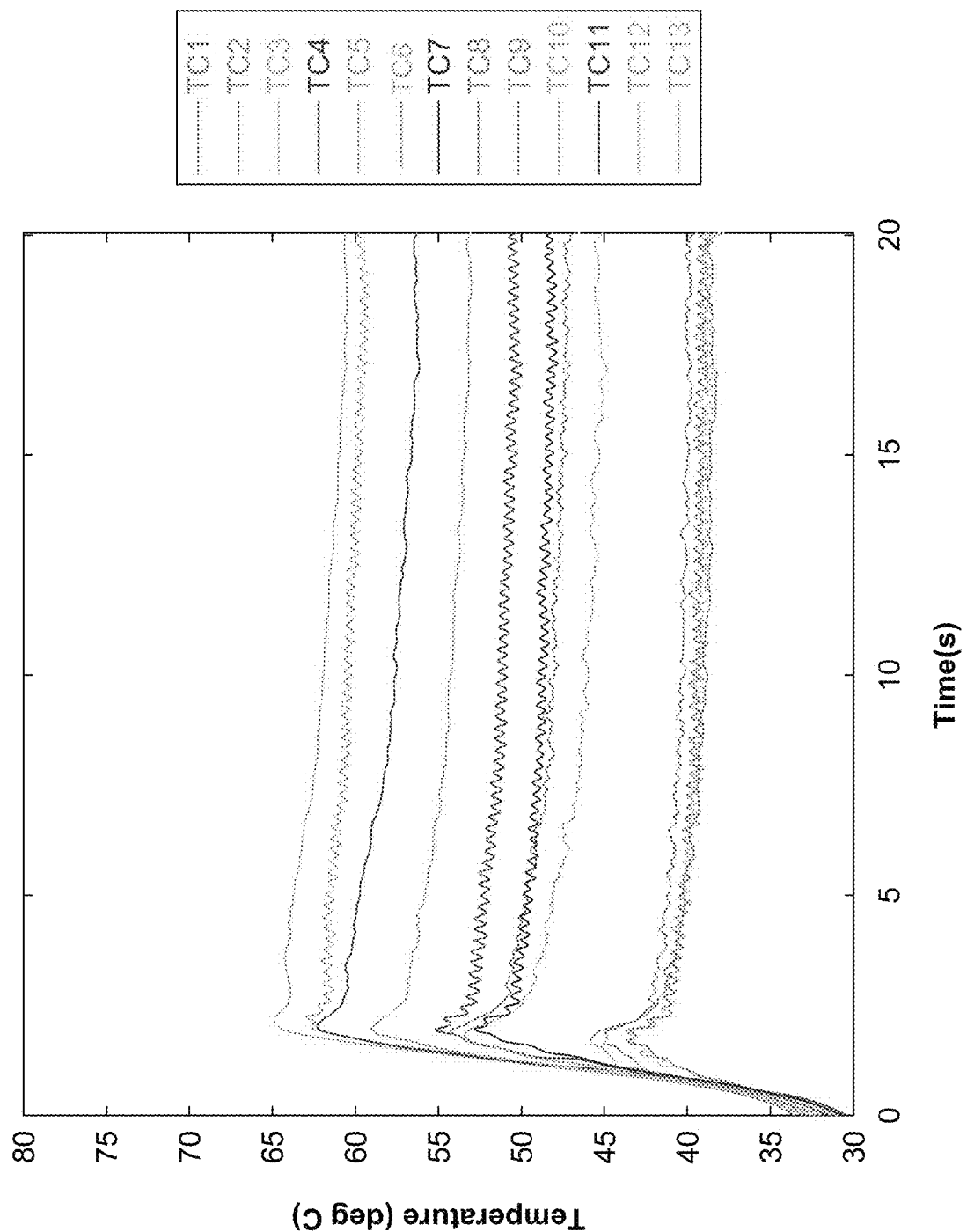
FIG. 34 is a graph of temperature data over time from a plurality of thermocouples distributed about a catheter tip during an ablation therapy, consistent with various aspects of the present disclosure.

FIG. 34 is a graph of temperature data over time from a plurality of thermocouples distributed about a catheter tip during an ablation therapy, consistent with various aspects of the present disclosure. In the present embodiment, a longitudinal axis of the catheter tip is positioned in parallel with a surface of the myocardial tissue, and a single side of the catheter tip is placed in contact with the tissue (see, e.g., FIG. 31C). The controller circuitry may receive and analyze the signals from the thermocouples to determine this relative orientation. As shown in FIG. 34, the signal from distal thermocouple TC5 (which is one of a series of thermocouples circumferentially distributed about a distal portion of the catheter tip) is indicative of the largest temperature spike. Proximal thermocouples TC12 and TC13 (which are substantially radially aligned with TC5) output signals indicative of the next two largest temperature spikes. The signals from each of the remaining thermocouples decrease in relation to the relative radial offset from TC5.

Catheter tips having a variety of thermometry configurations could be deployed successfully with the (pulsed) RF control systems described herein. Thus, although the representative catheter tips described herein include six or twelve radially-disposed thermal sensors and one distal thermal sensor placed close to the distal end of the catheter tip, the invention is not limited to such seven-sensor and thirteen-sensor configurations.

Also, catheters comprising various segmented tip designs may work to good advantage with the control systems described above. Some such tip configurations are disclosed in U.S. patent application No. 61/896,304, filed 28 Oct. 2013, and in related international patent application no. PCT/US2014/062562, filed 28 Oct. 2014 and published 7 May 2015 in English as international publication no. WO 2015/065966 A2, both of which are hereby incorporated by reference as though fully set forth herein.

It should also be noted that the control systems described herein may use a "rolling thermocouple," which would, for example, measure the temperature output from each of a plurality of thermocouples every 20 msec (for example) and report the highest of these temperatures to the pulse control box and, potentially, directly to the generator (at least for safety shutdown reasons). In this manner, and in view of the low thermal mass of the ablation tips described herein, the controller is always working with the most accurate representation of the actual tissue temperature. In particular, since the device has low thermal mass, any temperature sensors facing away from the tissue during use of the catheter in an ablation procedure would cool rapidly and their readings could be ignored or discounted, whereas the temperature sensor or sensors closest to the portion of the catheter tip that is in contact with tissue would heat rapidly and would, therefore, provide a temperature reading that is closest to the actual temperature of the tissue being ablated. Thus, by using only the temperature reading from the hottest temperature sensor (or the two or three hottest temperature sensors) at any given time, the system is able to rapidly adjust for the widely varying readings being received from the thermal sensors as the catheter tip is rotated or pushed into tissue during actual use.

Although several embodiments have been described above with a certain degree of particularity, those skilled in the art could make numerous alterations to the disclosed embodiments without departing from the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the clinician. It will be further appreciated that for conciseness and clarity, spatial terms such as "vertical," "horizontal," "up," and "down" may be used herein with respect to the illustrated embodiments. However, surgical instruments may be used in many orientations and positions, and these terms are not intended to be limiting and absolute.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A method comprising:
    contacting a distal tip of an ablation catheter with tissue;
    conducting an ablation therapy on the tissue in contact with the distal tip of the ablation catheter, wherein an energy level is transmitted to the tissue;
    receiving temperature data from a plurality of thermocouples distributed about the distal tip of the ablation catheter;
    based on the received temperature data, determining one or more tip characteristics across the distal tip of the ablation catheter;
    generating a visualization of the ablation catheter, the visualization including a depiction of the distal tip and a depiction of a plurality of thermocouple nodes, wherein at least one of the plurality of thermocouple nodes is a single thermocouple node that is depicted based on an average temperature value calculated from the temperature data associated with two or more thermocouples of the plurality of thermocouples;
    causing the visualization to be displayed on a display device, thereby enabling a clinician to estimate a coupling between the distal tip and the tissue during the ablation therapy;
    monitoring variation of the one or more tip characteristics;
    calculating a blood flow in proximity to the distal tip of the ablation catheter based on the monitored variation of the one or more tip characteristics across the distal tip of the ablation catheter following the ablation therapy, wherein the monitoring includes comparing the received temperature data to a threshold temperature; and
    adjusting the energy level transmitted to the tissue in a subsequent ablation therapy by pulsing the energy level, based on the calculated blood flow and the variation of the one or more tip characteristics, to create a desired lesion size at an interface between the tissue and the distal tip of the ablation catheter.

2. The method of claim 1, wherein the one or more tip characteristics includes at least one of the following: number of thermocouples above the threshold temperature, tissue contact area, temperature distribution, tip orientation, electrical coupling, and thermal gradients.

3. The method of claim 2, further including determining the tissue contact area between the distal tip and the tissue based on the number of thermocouples above the threshold temperature or a percentage of temperature increase above a temperature baseline.

4. The method of claim 3, further including determining an energy delivered by the distal tip of the ablation catheter to the tissue contact area by the ablation therapy.

5. The method of claim 4, further including determining a resulting lesion size on the tissue based upon the energy delivered to the tissue contact area and the tissue contact area between the distal tip of the ablation catheter.

6. The method of claim 1, further including determining an orientation of the distal tip of the ablation catheter relative to the tissue based on a location of the plurality of thermocouples above a temperature threshold indicative of tip-tissue contact.

7. The method of claim 1, further including receiving impedance-based data from a tip electrode, and estimating a tissue contact area based on a combination of the temperature data from the plurality of thermocouples and the impedance-based data.

8. The method of claim 1, wherein the step of calculating the blood flow in proximity to the distal tip of the ablation catheter is based on at least an additional set of temperature data received immediately following the ablation therapy.

9. The method of claim 8, wherein the step of calculating blood flow further includes determining a high blood flow in response to a temperature drop.

10. The method of claim 1, further including determining tip-tissue coupling efficacy, and wherein a temperature rise during the ablation therapy above a threshold rate is indicative of good tip-tissue coupling, and a temperature rise during the ablation therapy below a threshold rate is indicative of poor tip-tissue coupling.

11. The method of claim 1, wherein the step of conducting the ablation therapy includes energizing the distal tip of the ablation catheter with an approximately 1-5 second burst of approximately 10-30 Watts of power.

12. A method for estimating tip-tissue coupling between tissue and an ablation catheter tip, the method comprising:
contacting the ablation catheter tip with the tissue;
generating a non-therapeutic energy;
emitting the non-therapeutic energy from the ablation catheter tip to the contacted tissue;
receiving temperature data from a plurality of thermocouples distributed about known locations of the ablation catheter tip while the non-therapeutic energy is emitted from the ablation catheter tip;
generating a visualization including a depiction of the ablation catheter tip and a depiction of a plurality of thermocouple nodes, wherein at least one of the plurality of thermocouple nodes is a single thermocouple node that is depicted based on an average temperature value calculated from the temperature data associated with two or more thermocouples of the plurality of thermocouples;
causing the visualization to be displayed on a display device, thereby enabling a clinician to estimate a coupling between the ablation catheter tip and the tissue;
conducting thermocouple temperature rise time analysis;
associating at least some of the plurality of thermocouples with a tip-tissue contact area based on the temperature data;
calculating a blood flow in proximity to the ablation catheter tip based on the temperature data;
estimating a total tip-tissue contact area based upon the temperature rise time analysis and tip-tissue contact areas; and
computing an estimated power density delivered to the contacted tissue during emission of the non-therapeutic energy to the contacted tissue based on the estimated total tip-tissue contact area to assess a likelihood of tissue necrosis.

13. The method of claim 12, wherein the step of estimating a total tip-tissue contact area is conducted prior to an ablation therapy, and wherein a therapeutic energy generated for the ablation therapy is based at least in part on the total tip-tissue coupling area estimate.

14. The method of claim 12, further including determining distal tip orientation relative to the tissue based on respective locations of the plurality of thermocouples above a temperature threshold indicative of tip-tissue contact.

15. The method of claim 12, further including receiving impedance-based data from a tip electrode of the ablation catheter tip, and the step of estimating a total tip-tissue contact area estimate is based on a combination of the temperature data from the plurality of thermocouples and the impedance-based data from the tip electrode.

16. The method of claim 12, wherein the non-therapeutic energy is approximately 2-3 Watts.

17. The method of claim 12, wherein the non-therapeutic energy is approximately 1 Watt.

18. A method of tissue ablation with an ablation catheter tip, the method comprising:
contacting tissue with the ablation catheter tip;
transmitting energy to the tissue through the ablation catheter tip to effect tissue ablation;
receiving temperature data from a plurality of thermocouples distributed about the ablation catheter tip;
generating a visualization of the ablation catheter, the visualization including a depiction of the ablation catheter tip and a depiction of a plurality of thermocouple nodes, wherein at least one of the plurality of thermocouple nodes is a single thermocouple node that is depicted based on an average temperature value calculated from the temperature data associated with two or more thermocouples of the plurality of thermocouples;
causing the visualization to be displayed on a display device, thereby enabling a clinician to estimate a coupling between the ablation catheter tip and the tissue during the ablation therapy;
determining, while tissue ablation is being effected, a coupling area between the ablation catheter tip and the tissue based on the temperature data from the plurality of thermocouples;
monitoring variation of the temperature data;
calculating a blood flow in proximity to the ablation catheter tip based on the monitored variation of the temperature data; and
adjusting an energy level of energy transmitted to the tissue during a subsequent tissue ablation by pulsing the energy level, based on the received temperature data and the calculated blood flow, to create a lesion in the tissue.

19. The method of claim 18, further including determining good tip-tissue coupling in response to a temperature rise above a threshold rate;
determining poor tip-tissue coupling in response to a temperature rise below a threshold rate; and
in response to an indication of poor tip-tissue coupling, increasing energy delivered to the tissue to create a desired lesion size at an interface between the tissue and the ablation catheter tip.

* * * * *